(12) United States Patent
Sun et al.

(10) Patent No.: US 11,776,095 B2
(45) Date of Patent: Oct. 3, 2023

(54) PHOTO RELIGHTING USING DEEP NEURAL NETWORKS AND CONFIDENCE LEARNING

(71) Applicant: GOOGLE LLC, Mountain View, CA (US)

(72) Inventors: Tiancheng Sun, Mountain View, CA (US); Yun-ta Tsai, Mountain View, CA (US); Jonathan Barron, Mountain View, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 17/260,364

(22) PCT Filed: Apr. 1, 2019

(86) PCT No.: PCT/US2019/025205
§ 371 (c)(1),
(2) Date: Jan. 14, 2021

(87) PCT Pub. No.: WO2020/068158
PCT Pub. Date: Apr. 2, 2020

(65) Prior Publication Data
US 2021/0264576 A1      Aug. 26, 2021

Related U.S. Application Data

(60) Provisional application No. 62/749,081, filed on Oct. 22, 2018, provisional application No. 62/735,506, filed on Sep. 24, 2018.

(51) Int. Cl.
*G06T 5/00* (2006.01)
*G06T 15/50* (2011.01)

(52) U.S. Cl.
CPC ............ *G06T 5/008* (2013.01); *G06T 15/506* (2013.01); *G06T 2207/20081* (2013.01); *G06T 2207/20084* (2013.01)

(58) Field of Classification Search
CPC .................. G06T 5/008; G06T 15/506; G06T 2207/20081; G06T 2207/20084
(Continued)

(56) References Cited

U.S. PATENT DOCUMENTS

2017/0262962 A1* 9/2017 Rad .................. G06V 10/82
2018/0253869 A1* 9/2018 Yumer .................. G06T 11/60
(Continued)

OTHER PUBLICATIONS

The International Search Report (ISR) with Written Opinion for PCT/US2019/025205 dated Jul. 29, 2019, pp. 1-15.
(Continued)

*Primary Examiner* — Van D Huynh
(74) *Attorney, Agent, or Firm* — McDonnell Boehnen Hulbert & Berghoff LLP

(57) ABSTRACT

Apparatus and methods related to applying lighting models to images of objects are provided. A neural network can be trained to apply a lighting model to an input image. The training of the neural network can utilize confidence learning that is based on light predictions and prediction confidence values associated with lighting of the input image. A computing device can receive an input image of an object and data about a particular lighting model to be applied to the input image. The computing device can determine an output image of the object by using the trained neural network to apply the particular lighting model to the input image of the object.

20 Claims, 23 Drawing Sheets

─2300

2310 Train a neural network to apply a lighting model to an input image utilizing confidence learning that is based on light predictions and prediction confidence values associated with lighting of the input image

↓

2320 Receive an input image of an object and data about a particular lighting model to be applied to the input image at a computing device

↓

2330 Determine, by the computing device, an output image of the object by using the trained neural network to apply the particular lighting model to the input image of the object

(58) Field of Classification Search
USPC .......................................................... 382/274
See application file for complete search history.

(56) References Cited

U.S. PATENT DOCUMENTS

| | | | | |
|---|---|---|---|---|
| 2018/0359416 | A1* | 12/2018 | Hold-Geoffroy | .... G06V 10/764 |
| 2019/0164261 | A1* | 5/2019 | Sunkavalli | ............. G06N 3/045 |
| 2019/0340810 | A1* | 11/2019 | Sunkavalli | ............. G06T 15/506 |
| 2020/0074674 | A1* | 3/2020 | Guo | ...................... G06F 18/217 |
| 2020/0153385 | A1* | 5/2020 | Vincent | ................... H02S 50/00 |
| 2020/0273237 | A1* | 8/2020 | Sunkavalli | ............. G06N 20/00 |

OTHER PUBLICATIONS

Devries, Terrance et al. "Learning Confidence for Out-of-Distribution Detection in Neural Networks" Arxiv. Org. (2018) 12 pages, XP081221742.
Hu, Yuanming et al. "FC'4: Fully Convolutional Color Constancy with Confidence-Weighted Pooling" IEEE Conference on Computer Vision and Pattern Recognition (2017), pp. 330-339, XP033249369.
Xu, Zexiang et al. "Deep Image-Based Relighting from Optimal Sparse Samples" ACM Transactions on Graphics (2018) vol. 37(4) Article 126, p. 126, XP002792564.

\* cited by examiner

2300

2310 Train a neural network to apply a lighting model to an input image utilizing confidence learning that is based on light predictions and prediction confidence values associated with lighting of the input image 2320 Receive an input image of an object and data about a particular lighting model to be applied to the input image at a computing device 2330 Determine, by the computing device, an output image of the object by using the trained neural network to apply the particular lighting model to the input image of the object

PHOTO RELIGHTING USING DEEP NEURAL NETWORKS AND CONFIDENCE LEARNING

CROSS-REFERENCE TO RELATED APPLICATIONS

This application claims priority to U.S. Pat. App. No. 62/735,506, filed on Sep. 24, 2018, entitled "Photo Relighting using Deep Neural Networks and Confidence Learning", and claims priority to U.S. Pat. App. No. 62/749,081, filed on Oct. 22, 2018, entitled "Photo Relighting using Deep Neural Networks and Confidence Learning", the contents of all of which are fully incorporated by reference herein for all purposes.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized.

In one aspect, a computer-implemented method is provided. A neural network is trained to apply a lighting model to an input image. The training of the neural network utilizes confidence learning that is based on light predictions and prediction confidence values associated with lighting of the input image. A computing device receives an input image of an object and data about a particular lighting model to be applied to the input image. The computing device determines an output image of the object by using the trained neural network to apply the particular lighting model to the input image of the object.

In another aspect, a computing device is provided. The computing device includes one or more processors and data storage. The data storage has stored thereon computer-executable instructions that, when executed by the one or more processors, cause the computing device to carry out functions. The functions include: training a neural network to apply a lighting model to an input image utilizing confidence learning that is based on light predictions and prediction confidence values associated with lighting of the input image; receiving an input image of an object and data about a particular lighting model to be applied to the input image; and determining an output image of the object by using the trained neural network to apply the particular lighting model to the input image of the object.

In another aspect, an article of manufacture is provided. The article of manufacture includes one or more computer readable media having computer-readable instructions stored thereon that, when executed by one or more processors of a computing device, cause the computing device to carry out functions. The functions include: training a neural network to apply a lighting model to an input image utilizing confidence learning that is based on light predictions and prediction confidence values associated with lighting of the input image; receiving an input image of an object and data about a particular lighting model to be applied to the input image; and determining an output image of the object by using the trained neural network to apply the particular lighting model to the input image of the object.

In another aspect, a computing device is provided. The computing device includes means for training a neural network to apply a lighting model to an input image utilizing confidence learning that is based on light predictions and prediction confidence values associated with lighting of the input image; means for receiving an input image of an object and data about a particular lighting model to be applied to the input image; and means for determining an output image of the object by using the trained neural network to apply the particular lighting model to the input image of the object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 23 is a flowchart of a method, in accordance with example embodiments.

DETAILED DESCRIPTION

Figure 1:
FIG. 1 illustrates images with imperfect lighting, in accordance with example embodiments.
Figure 1:
Figure 1:

This application relates to changing lighting of an image of an object, such as an object depicting a human face, using machine learning techniques, such as but not limited to neural network techniques. When a mobile computing device user takes an image of an object, such as a person, the resulting image may not always have ideal lighting. For example, the image could be too bright or too dark, the light may come from an undesirable direction, or the lighting may include different colors that give an undesirable tint to the image. Further, even if the image does have a desired lighting at one time, the user might want to change the lighting at a later time. As such, an image-processing-related technical problem arises that involves adjusting lighting of an already-obtained image.

To allow user control of lighting of images, particularly images of human faces and similar objects, the herein-described techniques apply a model based on a convolutional neural network to correct lighting of images. The herein-described techniques include receiving an input image and data about a particular lighting model to be applied to the input image, predicting an output image that applies the data about the particular lighting model to be applied to the input image using the convolutional neural network, and generating an output based on the output image. The input and output images can be high-resolution images, such as multi-megapixel sizes images captured by a camera of a mobile computing device. The convolutional neural network can work well with input images captured under a variety of natural and artificial lighting conditions. In some examples, a trained model of the convolutional neural network can work on a variety of computing devices, including but not limited to, mobile computing devices (e.g., smart phones, tablets, cell phones, laptops), stationary computing devices (e.g., desktops), and server computing devices. Thus, the convolutional neural network can apply the particular lighting model to an input image, thereby adjusting the lighting of the input image and solving the technical problem of adjusting the lighting of an already-obtained image.

The input image can be lighted, and that lighting of the input image can be represented by an original lighting model. A lighting model, such as the above-mentioned particular lighting model or the original lighting model, can be represented by a grid of lighting cells, where each lighting cell contains data related to the lighting of at least a portion of a corresponding image. The data related to the lighting of at least a portion of a corresponding image can represent one or more colors, intensities, albedos, directions, and/or surface normals for the lighting of the portion of the corresponding image. For example, a 512×512 pixel input image can have a corresponding original lighting model represented by a 16×32 grid of lighting cells. Other example input images and grids of lighting cells are possible as well; for example, with different sized images, larger lighting models, etc. Also, more, less, and/or different data can be stored a lighting cell of the grid of lighting cells.

A neural network, such as a convolutional neural network, can be trained using a training data set of images to apply lighting models to images of objects, such as human faces. In some examples, the neural network can be arranged as an encoder/decoder neural network.

While examples described herein relate to determining and applying lighting models of images of objects with human faces, the neural network can be trained to determine and apply lighting models to images of other objects, such as objects that reflect light similarly to human faces. Human faces typically reflect light diffusely with some specular highlights due to directly reflected light. For example, specular highlights can result from direct light reflections from eye surfaces, glasses, jewelry, etc. In many images of human faces, such specular highlights are relatively small in area in proportion to areas of facial surfaces that diffusely reflect light. Thus, the neural network can be trained to apply lighting models to images of other objects that diffusely reflect light, where these diffusely reflecting objects may have some relatively-small specular highlights (e.g., a tomato or a wall painted with matte-finish paint). The images in the training data set can show one or more particular objects using lighting provided under a plurality of different conditions, such as lighting provided from different directions, lighting provided of varying intensities (e.g. brighter and dimmer lighting), lighting provided with light sources of different colors, lighting provided with different numbers of light sources, etc.

The neural network can be trained using confidence learning, where a prediction can be weighted by a confidence value (or values). For example, the neural network can generate a light prediction for each of a plurality of "patches" or portions of the image. Then, as part of confidence learning, the light prediction for a patch can be mathematically combined; e.g., multiplied, with a confidence value for the prediction also generated by the neural network. In some examples, the confidence value can be an output value explicitly predicted and/or otherwise provided by the neural network. In some examples, the confidence value can be an implicit value based on one or more of the weights of the neural network used to provide the prediction (e.g., a particular weight value, a maximum weight value, average weight value, minimum weight value, or some other weight value determined by combining some or all of the weights in the neural network). Confidence learning allows the neural network to weight lighting predictions based on the confidence values, leading to better light predictions by weighting more confident predictions over less confident predictions, and thereby enhancing the quality of output lighting predictions, and so enhancing the quality of predicted output images.

Once trained, the neural network can receive an input image and information about a desired lighting model. The trained neural network can process the input image to determine a prediction of an original lighting model of lighting provided to take the input image. The trained neural network can also process the image to apply the particular lighting model to the original image and predict an output image where the particular lighting model has been applied to the input image. Then, the trained neural network can provide outputs that include the predicted output image and/or the predicted original lighting model. In some examples, the neural network can be trained only to predict the original lighting model or to predict only the output image.

In one example, (a copy of) the trained neural network can reside on a mobile computing device. The mobile computing device can include a camera that can capture an input image of an object, such as a portrait of a person's face. A user of the mobile computing device can view the input image and determine that the input image should be relighted. The user can then provide the input image and the information on how the input image should be relighted to the trained neural network residing on the mobile computing device. In response, the trained neural network can generate a predicted output image that shows the input image relighted as indicated by the user and subsequently output the output image (e.g., provide the output image for display by the mobile computing device). In other examples, the trained neural network is not resident on the mobile computing device; rather, the mobile computing device provides the input image and the information on how the input image should be relighted to a remotely-located trained neural network (e.g., via the Internet or another data network). The remotely-located convolutional neural network can process the input image and the information on how the input image should be relighted as indicated above and provide an output image that shows the input image relighted as indicated by the user to the mobile computing device. In other examples, non-mobile computing devices can also use the trained neural network to relight images, including images that are not captured by a camera of the computing device.

In some examples, the trained neural network can work in conjunction with other neural networks (or other software) and/or be trained to recognize whether an input image of an object is poorly lit. Then, upon a determination that an input image is poorly lit, the herein-described trained neural network could apply a corrective lighting model to the poorly-lit input image, thereby correcting the poor lighting of the input image. The corrective lighting model can be chosen based on user input and/or be predetermined. For example, a user input lighting model or a predetermined lighting model can be to provide a "flat light" or light the object with a lighting model that provides minimal contrast in an image (e.g., a model that minimizes differences between brightly lit "highlights" and dimly lit "shadows" in the image).

In some examples, the trained neural network can take as inputs one input image and one or more lighting models and provide one or more resulting output images. Then, the trained neural network can determine the one or more resulting output images by applying each of the plurality of the lighting models to the input image. For example, the one or more lighting models can include a plurality of lighting models that represent one (or more) light source(s) that change location, lighting color, and/or other characteristics in each of the plurality of lighting models. More particularly, the plurality of lighting models could represent one or more light sources, where at least one light source changes location (e.g., by a predetermined amount) between provided models. In this approach, the resulting output images represent the input image shown as the changing light source(s) appear(s) to rotate or otherwise move about an object (or objects) depicted in the input image. Similarly, the changing light source(s) could change color (e.g., by a predetermined distance in a color space) between provided models so that the resulting output images represent the input image shown with a variety of colors of light. The plurality of output images could be provided as still images and/or as video imagery. Other effects could be generated by having the trained neural network apply a plurality of lighting models to one image (or relatedly, having the trained neural network apply one lighting model to a plurality of input images).

As such, the herein-described techniques can improve images by applying more desirable and/or selectable lighting models to images, thereby improving their actual and/or perceived quality. Improving the actual and/or perceived quality of images, including portraits of people, can provide emotional benefits to those who believe their pictures look better. These techniques are flexible, and so can apply a wide variety of lighting models to images of human faces and other objects, particularly other objects with similar lighting characteristics. Also, by changing a lighting model, different aspects of an image can be highlighted which can lead to better understanding of object(s) portrayed in the image.

Techniques for Image Relighting Using Neural Networks

FIG. 1 illustrates images 100 with imperfect lighting, in accordance with example embodiments. Images 100 include image 110, image 120, and image 130. Image 110 is an image that includes a human face with inconsistent lighting, where a left side of the human face is more brightly lit than a right side of the human face. Image 120 is an image that includes a human face with a relatively large number of shadows, including several shadows that obscure the human face. Image 130 is an image that includes a human face taken with dim lighting having a somewhat greenish tint that may be considered to be "moody". Other examples of images with imperfect lighting and other types of imperfect lighting are possible as well.

Figure 2:
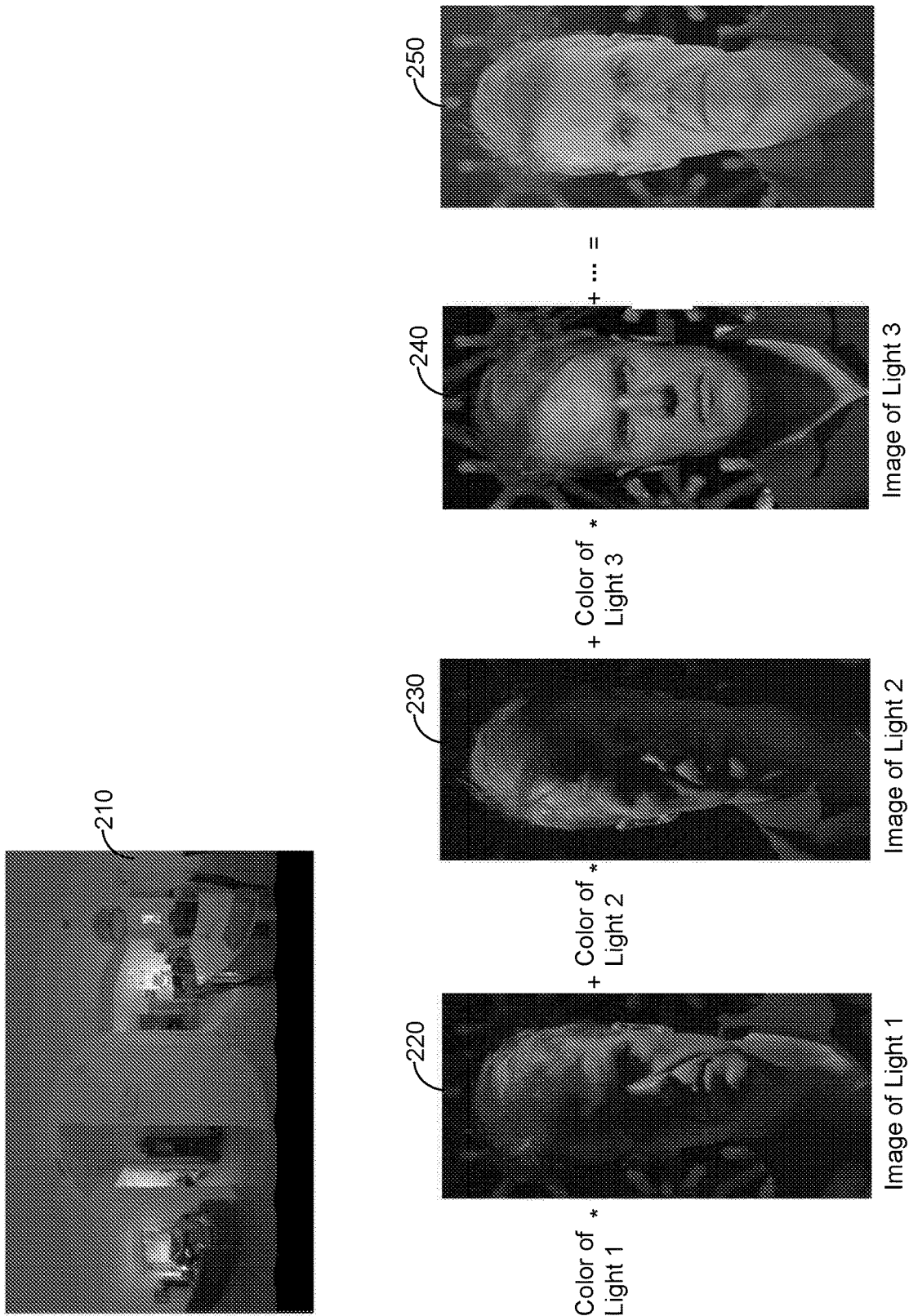
FIGS. 2 and 3 illustrate example images for training a convolutional neural network for changing lighting of images, in accordance with example embodiments.
Figure 3:
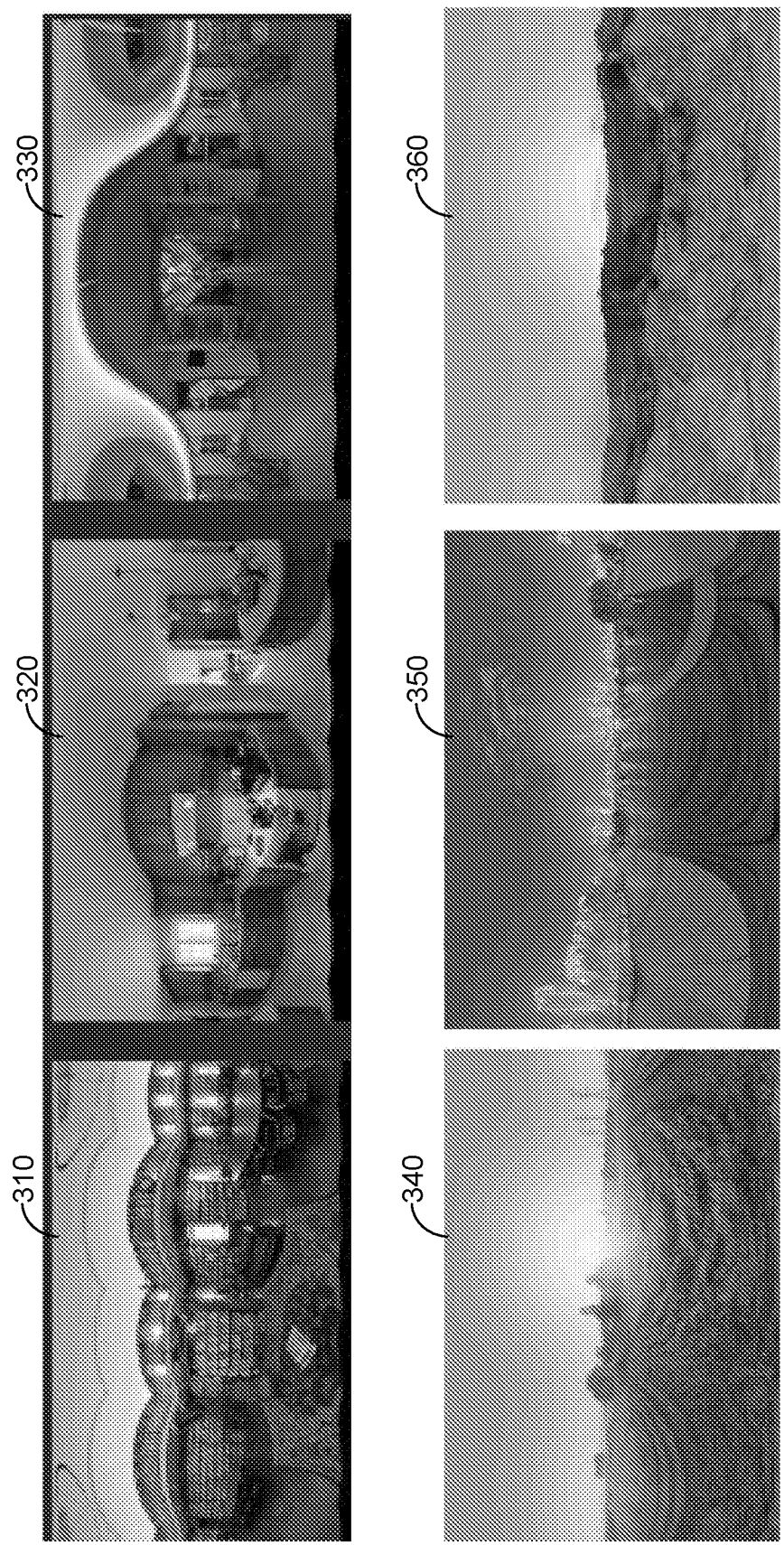

FIGS. 2 and 3 illustrate example images for training a convolutional neural network for changing lighting of images, in accordance with example embodiments. An upper portion of FIG. 2 shows image 210, which illustrates a scene with several light sources. A lower portion of FIG. 2 shows images 220, 230, 240, 250, which are images of a face of a person captured under different lighting conditions. Each of images 220, 230, 240, 250 are images of the same person and are taken from the same perspective and distance, for example, images captured by a camera at a same distance and orientation from the person.

An image of a person can be taken while being lighted by each individual light source depicted in image 210. For example, image 220 can be taken while being lighted by a first light source depicted in image 210, image 230 can be taken while being lighted by a second light source depicted in image 210, image 240 can be taken while being lighted by a third light source depicted in image 210, and so on. Each of images 220, 230, and 240 can be multiplied or otherwise combined with a color of each respective light source. FIG. 2 shows that pixels of image 220 can be multiplied by data representing a color of the first light source, pixels of image 230 can be multiplied by data representing a color of the second light source, and pixels of image 240 can be multiplied by data representing a color of the third light source. Then, after each image is combined with the color of the respective light source, the resulting colored images can be added or otherwise combined to obtain image 250 that represents the image of the person taken using all of the several light sources of the scene illustrated by image 210 as indicated by FIG. 2. Thus, image 250 appears to have been taken using the lighting provided in the scene illustrated by image 210. In some examples, some or all of images 220, 230, 240, 250 can be provided as part of a one-light-at-a-time (OLAT) data set.

FIG. 3 shows indoor images 310, 320, 330 representing indoor lighting conditions and outdoor images 330, 350, 360 that can be used to train a herein-described convolutional neural network. Images including images 310, 320, 330, 340, 350, 360 can be part of a training data set of images, where the training data set can include these images representing indoor and lighting conditions, as well as one or more OLAT data sets, other images of objects, such as faces, and perhaps other images. Then, the resulting training data set of images can be used to train a herein-described convolutional neural network.

Figure 4:
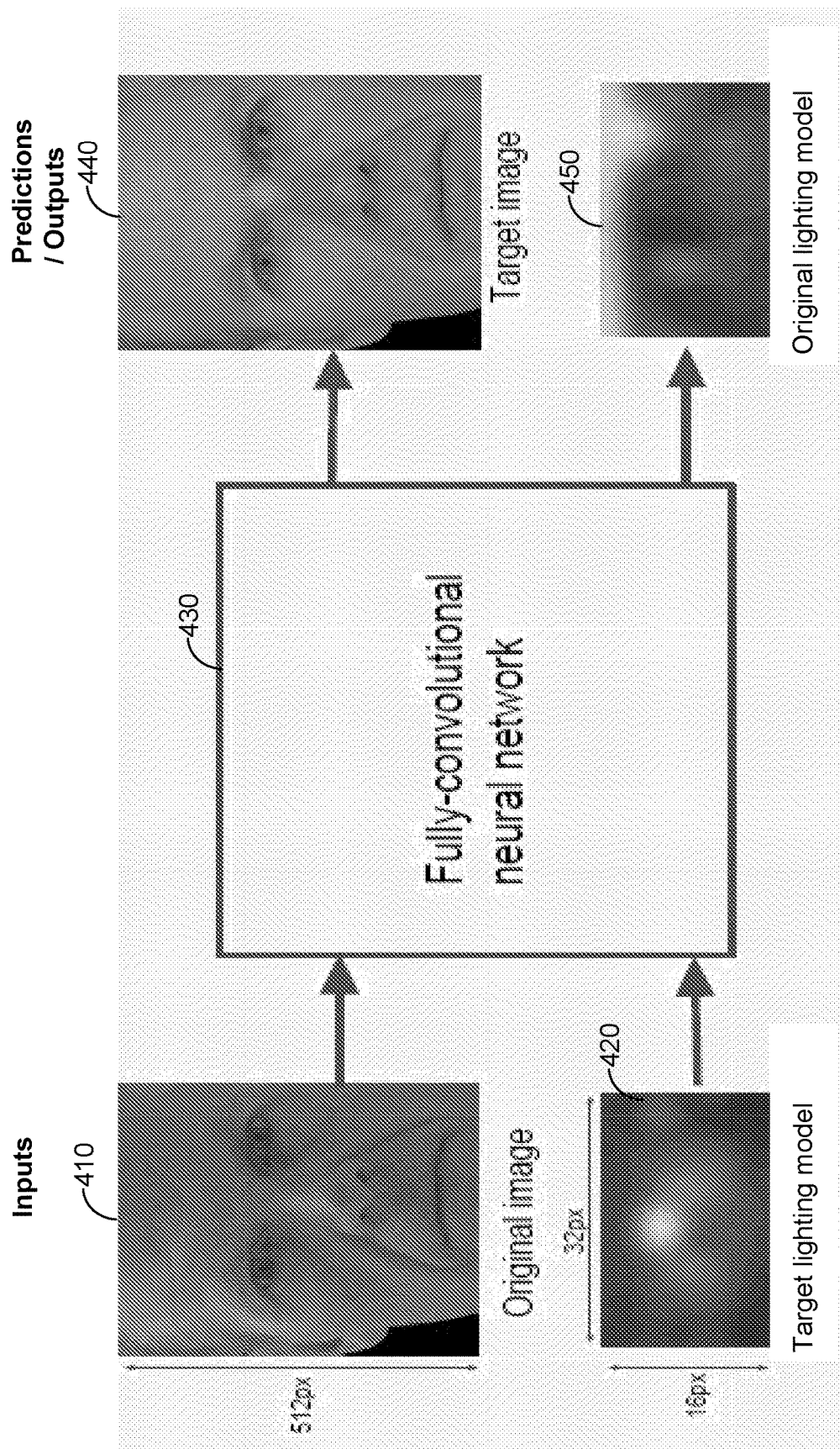
FIG. 4 is a diagram depicting training of a convolutional neural network for changing lighting of images, in accordance with example embodiments.

FIG. 4 is a diagram depicting training of convolutional neural network 430 for changing lighting of images, in accordance with example embodiments. Convolutional neural network 430 can be a fully-convolutional neural network as describe herein. During training, convolutional neural network 430 can receive as inputs one or more input training images and input target lighting models. For example, FIG. 4 shows convolutional neural network 430 being trained on input original image 410 and input target lighting model (TLM) 420. During training, convolutional neural network 430 is being directed to generate predictions of target image 440 and of original lighting model 450. Target image 440 can be a predicted (or generated) image that would result by application of input target lighting model 420 to input original image 410. Thus, target image 440 can be a prediction of how original image 410 would appear lighted by input target lighting model 420 rather than by the actual lighting conditions used to illuminate original image 410 when original image 410 was originally captured. As such, target image 440 predicts how original image 410 would be relit by target lighting model 420.

Original lighting model 450 is a lighting model that predicts the actual lighting conditions used to illuminate original image 410. A lighting model can include a grid or other arrangement of lighting-model data related to lighting of part or all of one or more images. The lighting-model data can include, but is not limited to, data representing one or more colors, intensities, albedos, directions, and/or surface normals for the lighting of part or all of the one or more images. As such, each of lighting models 420, 450 can include lighting-model data related to lighting of at least a portion of a corresponding image. Target lighting model 420 can relate to lighting of target image 440, and original lighting model 450 can relate to lighting of original image 410.

FIG. 4 also illustrates example sizes of images and lighting models—each of original and target images are images of size 512×512 pixels, and each target lighting model 420 and original lighting model 450 are grids of 16×32 cells of lighting-model data. Other sizes of original images, original lighting models, target images, and target lighting models are possible as well.

Figure 5:
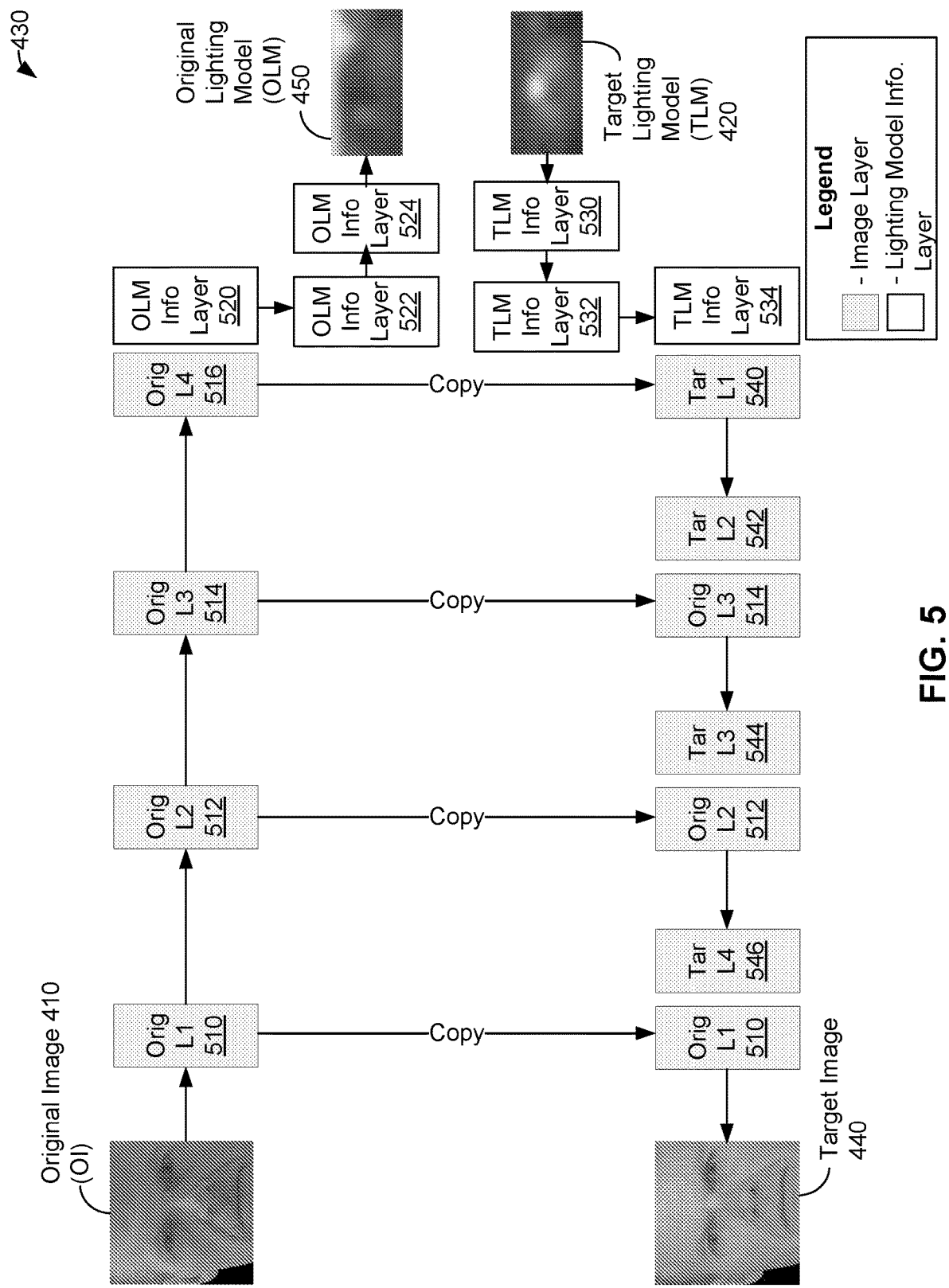
FIG. 5 is a block diagram of the convolutional neural network of FIG. 4, in accordance with example embodiments.

FIG. 5 is a block diagram of the convolutional neural network 430, in accordance with example embodiments. Convolutional neural network 430 can receive original image 410 and target lighting model 420 as inputs, as indicated at upper left and lower right respectively. Convolutional neural network 430 can process both original image 410 and target lighting model 420. Original image 410 can be processed to determine a prediction of original lighting model (OLM) 450 and to provide inputs to determine a prediction of target image 440. Target lighting model 420 can be used to determine the prediction of target image 440.

Convolutional neural network 430 can include layers of nodes for processing original image 410 and target lighting model 420. Example layers can include, but are not limited to, input layers, convolutional layers, activation layers, pooling layers, fully connected layers, and output layers. Input layers can store input data, such as pixel data of original image 410 and inputs from other layers of convolutional neural network 430. Convolutional layers can compute an output of neurons connected to local regions in the input. In some cases, a convolutional layer can act as a transposed convolution or deconvolution layer to apply a filter to a relatively small input to expand/upsample the relatively small input to become a larger output. Activation layers can determine whether or not an output of a preceding layer is "activated" or actually provided (e.g., provided to a succeeding layer). Pooling layers can downsample the input. For example, convolutional neural network 430 can involve one or more pooling layers downsample the input by a predetermined factor (e.g., a factor of two) in the horizontal and/or vertical dimensions. Fully connected layers can determine scores related to the prediction. Such scores can include, but are not limited to, a score related to a predicted original lighting model, and/or a score related to a predicted target image. Output layers can provide an output of conventional neural network 430 to software and/or hardware interfacing with conventional neural network 430; e.g. to hardware and/or software used to display, print, communicate and/or otherwise provide target image 440. Other layers, such as batch normalization layers, could be in convolutional neural network 430 as well. Layers 510, 512, 514, 516, 520, 522, 524, 530, 532, 534, 540, 542, 544, 546 can include one or more input layers, output layers, convolutional layers, activation layers, pooling layers, fully connected layers, and/or other layers described herein.

Figure 6:
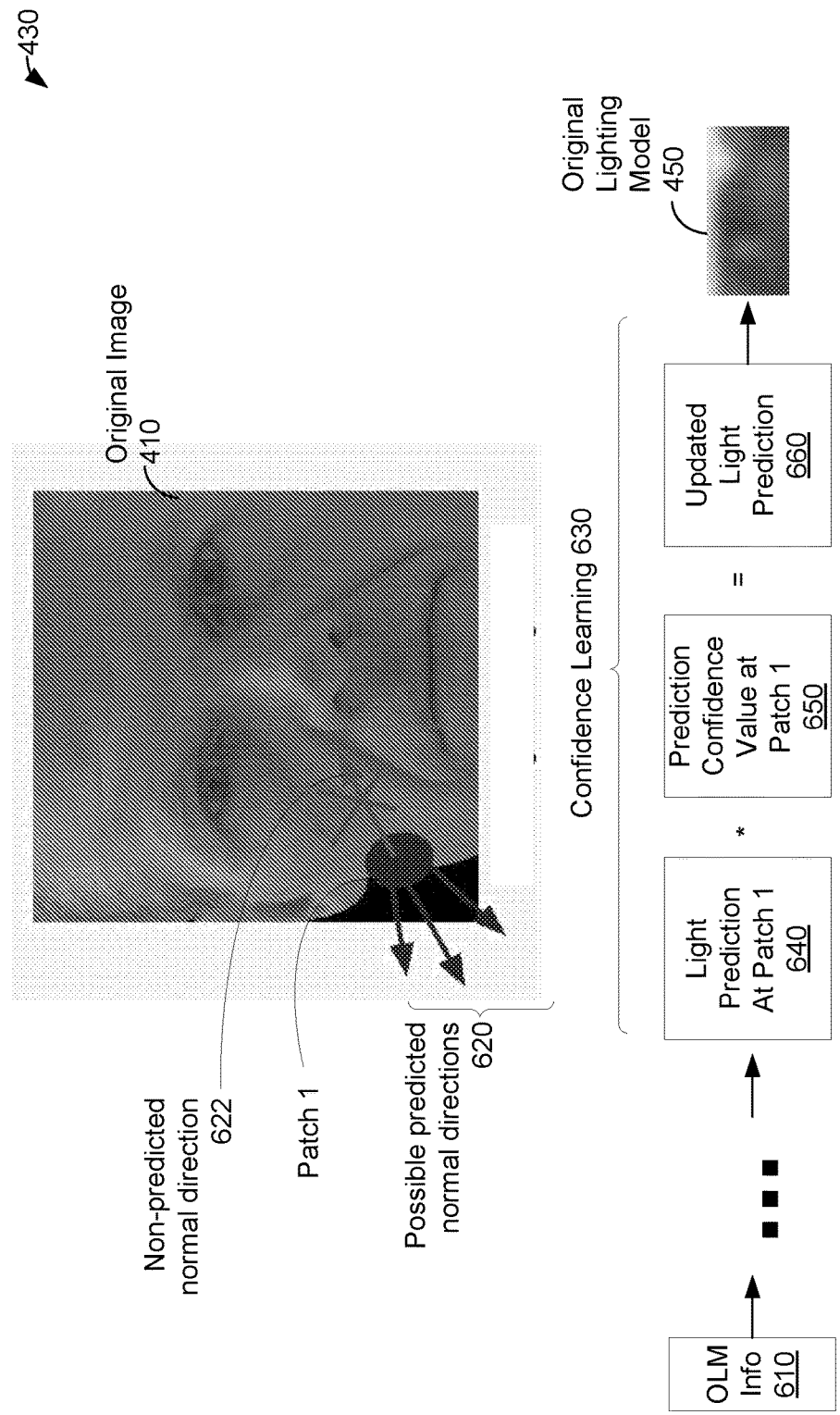
FIG. 6 is a block diagram illustrating confidence learning used by the convolutional neural network of FIG. 4 during training, in accordance with example embodiments.

In FIGS. 5 and 6, layers of convolutional neural network 430 involved in processing original image 410 and target lighting model 420 to determine the prediction of target image 440 are shown using grey blocks. Also, information of convolutional neural network 430 used to determine the prediction of original lighting model and in processing target lighting model 420 is shown using yellow blocks. More particularly, convolutional neural network 430 can include original layers 510, 512, 514, 516 arranged respectively as in an order as layers L1, L2, L3, L4, each successively convolving its input and providing its output to a successive layer until reaching original layer L4 516.

Output layer L4 516 can be associated with a first original lighting model (OLM) information layer 520, which can provide outputs to a second original lighting model information layer 522, which in turn can provide outputs to a third original lighting model information layer 524, which can include an output layer to provide predicted original lighting model 450. For example, original lighting model information layers 520, 522, 524 can include one or more fully connected layers used to predict original lighting model 450. In some examples, original lighting model information layer 520 can receive lighting-related features of original image 410 determined by original layers 510, 512, 514, 516. For example, original layer 516 can output or otherwise provide lighting-related features to original lighting model information layer 520.

A first target lighting model (TLM) information layer 530 can act as an input layer to receive target lighting model 420 as an input. Target lighting model information layer 530 can provide output to a second target lighting model information layer 532, which in turn can provide output to a third target lighting model information layer 534. Target lighting model information layer 534 can include an output layer to provide lighting features related to target lighting model 420. For example, target lighting model information layers 530, 532, 534 can include fully connected layers used to predict original lighting model 450. In some examples, original lighting model information layer 520 can receive lighting-related features of original image 410 determined by original layers 510, 512, 514, 516. For example, original layer 516 can output or otherwise provide lighting-related features to original lighting model information layer 520.

In FIGS. 5 and 6, a depicted layer can include one or more actual layers. For example, original layer L1 510 can have one or more input layers, one or more activation layers, and/or one or more additional layers. As another example, original layer L2 512, original layer L3 514, and/or original layer L4 516 can include one or more convolutional layers, one or more activation layers (e.g., having a one-to-one relationship to the one or more convolutional layer), one or more pooling layers, and/or one or more additional layers.

In some examples, some or all of the pooling layers in convolutional neural network 430 can downsample an input by a common factor in both horizontal and vertical dimensions, while not downsampling depth dimensions associated with the input. The depth dimensions could store data for pixel colors (red, green, blue) and/or data representing scores. For example, suppose that original image 410 is of size 512×512 with depth D, that each of original layers 510, 512, 514, 516 include one pooling layer, and each pooling layer of original layers 510, 512, 514, 516 downsample original image 410 by a factor of 2 in both horizontal and vertical dimensions. In that case, the output of original layer 510 would be of size 256×256×D, the output of original layer 512 would be of size 128×128×D, the output of original layer 514 would be of size 64×64×D, and the output of original layer 516 would be of size 32×32×D. Other common factors for downsampling other than two can be used as well by one or more (pooling) layers of convolutional neural network 430.

Original layer L1 510 can receive and process original image 410 and provide an output to original layer L2 512. Original layer L2 512 can process the output of original layer L1 and provide an output to original layer L3 514. Original layer L3 514 can process the output of original layer L2 and provide an output to original layer L4 516. Original layer L4 516 can process the output of original layer L3. At least part of the output of original layer L4 516 can be provided as an input to original lighting model information layer 520.

Convolutional neural network 430 can predict original lighting model 450 using original lighting model information layers 520, 522 and 524. Original lighting model 450 may be output by lighting model information layer 524 of convolutional neural network 430 Confidence learning can be used by convolutional neural network 430 to train original lighting model information layers 520, 522 and 524 to predict original lighting model 450. Confidence learning is discussed herein in more detail at least in the context of FIG. 6.

To predict target image 440, convolutional neural network 430 can process target lighting model 420 using target lighting model information layers 530, 532, and 534. The output of target lighting model information layer 534 can be provided as an input to target layer L1 540 along with data provided by data copied from original layer L4 516 (e.g., using a skip connection between original layer L4 516 and target layer L1 540) to begin predicting target image 440. Target layer L2 542 can receive and process inputs from both target layer L1 540 and original layer L3 514 (e.g., using a skip connection between original layer L3 514 and target layer L2 542) to provide an output to target layer L3 544. Target layer L3 544 can receive and process inputs from both target layer L2 542 and original layer L2 512 (e.g., using a skip connection between original layer L2 512 and target layer L3 544) to provide an output to target layer L4 546. Target layer L4 546 can receive and process inputs from both target layer L3 544 and original layer L1 510 to provide a prediction of target image 440, which can then be output from target layer L4 546. The data provided by skip connections between original layers 516, 514, 512, 510 and respective target layers 540, 542, 544, 546 can be used by each respective target layer to provide additional details for generating a target layer's contribution to the prediction of target image 440. In some examples, each of target layers 540, 542, 544, 546 used to predict target image 440 can include one or more convolution layers (perhaps performing transpose convolution/deconvolution), one or more activation layers, and perhaps one or more input and/or output layers. In some examples, some or all of layers 510, 512, 514, 516, 520, 522, 524, 530, 532, 534, 540, 542, 544, 546 can act as a convolutional encoder/decoder network.

Loss measures can be used during training of convolutional neural network 430. For example, an L2 loss measure between target image predictions and training images can be minimized during training of convolutional neural network 430 for predicting target image 440. As another example, a log L1 loss measure between original lighting model predictions and training lighting model data can be minimized during training of convolutional neural network 430 for predicting original lighting model 450. Other loss measures can be used as well or instead.

In some examples, convolutional neural network 430 can include perceptual loss processing. For example, convolutional neural network 430 can use generative adversarial net (GAN) loss functions to determine if part or all of an image would be predicted to be actually lit by a particular lighting model and so satisfy one or more perceptually-related conditions on lighting of that part of the image. In some examples, cycle loss can be used to feed predicted target images and/or original lighting models back into convolutional neural network 430 to generate and/or refine further predicted target images and/or original lighting models. In some examples, convolutional neural network 430 can utilizes deep supervision techniques to provide constraints on intermediate layers. In some examples, convolutional neural network 430 can have more, fewer, and/or different layers to those shown in FIG. 5.

FIG. 6 is a block diagram illustrating confidence learning 630 used during training by convolutional neural network 430, in accordance with example embodiments. As mentioned above, original lighting model information layers 520, 522 and 524 can be used to predict original lighting model 450. Confidence learning can be used during training of one or more of original lighting model information layers 520, 522 and 524.

To determine original lighting model 450, original lighting model information layers 520, 522 and 524 can determine predictions about lighting features, such as predictions about light directions. An upper portion of FIG. 6 shows a location "Patch 1" of original image 410 and shows possible predicted normal directions 620 of rays of light falling on the face at Patch 1 using red arrows. Possible predicted normal directions 620 face outwards from the depicted face at Patch 1, since rays of light falling on Patch 1 are likely to be emitted from outside of the depicted face and so have a normal incident on the depicted face that outwards from the face. In contrast, non-predicted normal direction 622, depicted in FIG. 6 using a blue arrow, would be associated with light coming from inside the depicted face at Patch 1, which is unlikely. Light from non-predicted normal direction 622 should not be predicted after training of convolutional neural network 430. However, during training of original lighting model information layers 520, 522 and/or 524, a lighting model indicating light from non-predicted normal direction 622 could be predicted, where confidence that light could come from non-predicted normal direction 622 decreases as the training proceeds.

Confidence learning 630 can be used to apply such confidence information during training of convolutional neural network 430. For example, while training original lighting model information layers 520, 522 and/or 524, convolutional neural network 430 (e.g., original layer L4 516 and/or original lighting model information layers 520, 522 524) can determine original lighting information 610. Original lighting information 610 can include a lighting model prediction at a patch or portion of an image; such as light prediction 640 about a normal direction and/or other properties of light falling on Patch 1 of the face depicted in original image 410. Further, convolutional neural network 430 (e.g., original layer L4 516 and/or original lighting model information layers 520, 522 524) can determine a confidence value 650 associated with prediction 640 of the lighting model at Patch 1.

Convolutional neural network 430 can be used to explicitly predict confidence value 650 or implicitly provide confidence value 650 based on some or all of the weights of convolutional neural network 430. In some examples, one or more of original layer L4 516 and/or original lighting model information layers 520, 522 524 can be used to explicitly predict confidence value 650 or implicitly provide confidence value 650 based on some or all of the weights of one or more of original layer L4 516 and/or original lighting model information layers 520, 522 524. More particularly, one or more of the weights of one or more of original layer L4 516 and/or original lighting model information layers 520, 522 524 can be used as confidence value 650. Then, confidence learning 630 can involve multiplying and/or otherwise mathematically combining, light prediction 640 with prediction confidence value 650 to determine updated light prediction 660. In comparison to using light prediction 640 during training, using updated light prediction 660 generated by confidence learning 630 can lead to emphasizing relatively-confident predictions over relatively-non-confident predictions during training of convolutional neural network 430, thereby providing additional use and feedback on the confidence of lighting predictions. Other examples and/or usages of confidence learning are possible as well.

Figure 7:
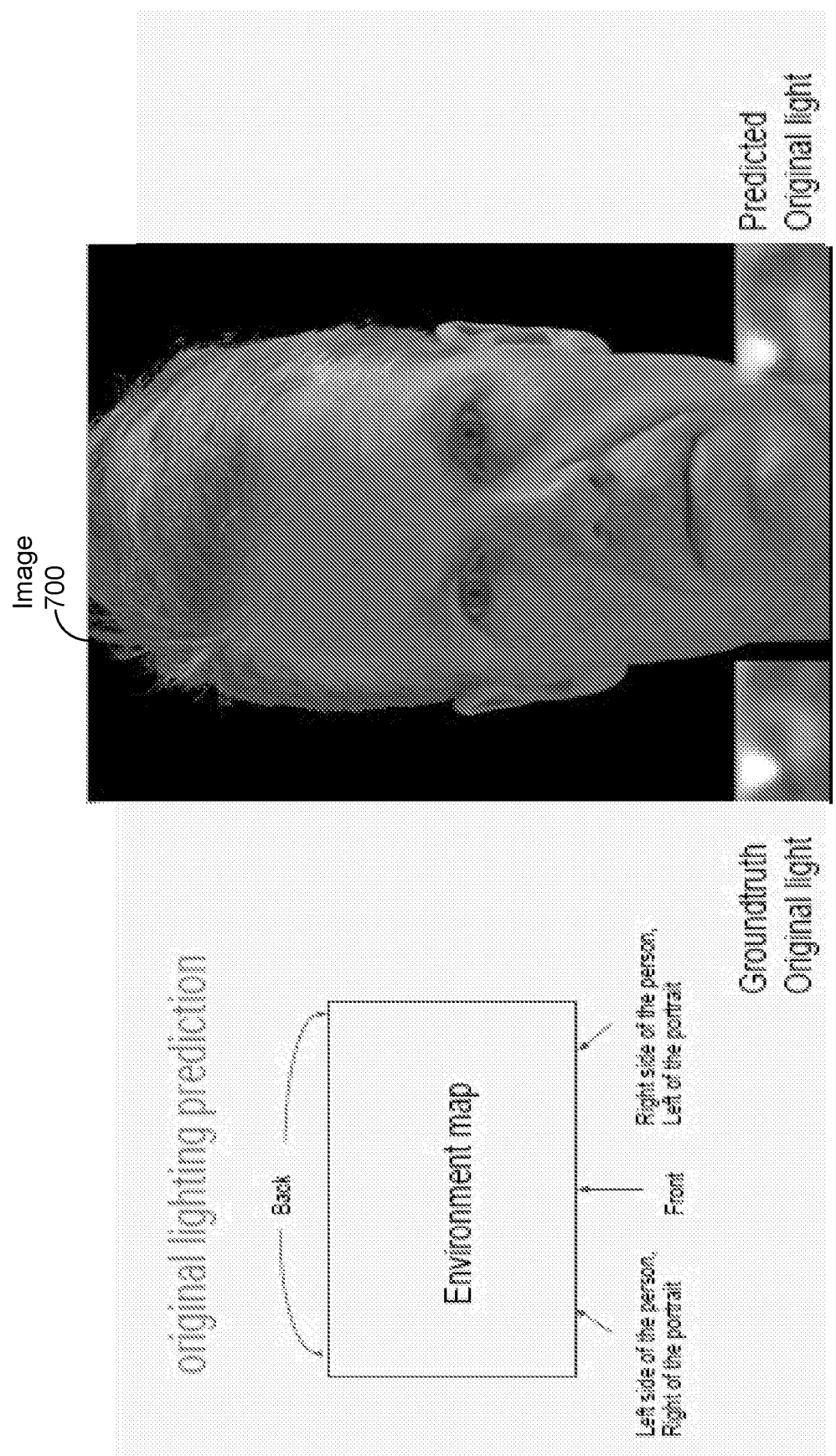
FIGS. 7-18 show example images of human faces generated by the convolutional neural network of FIG. 4, in accordance with example embodiments.
Figure 8:
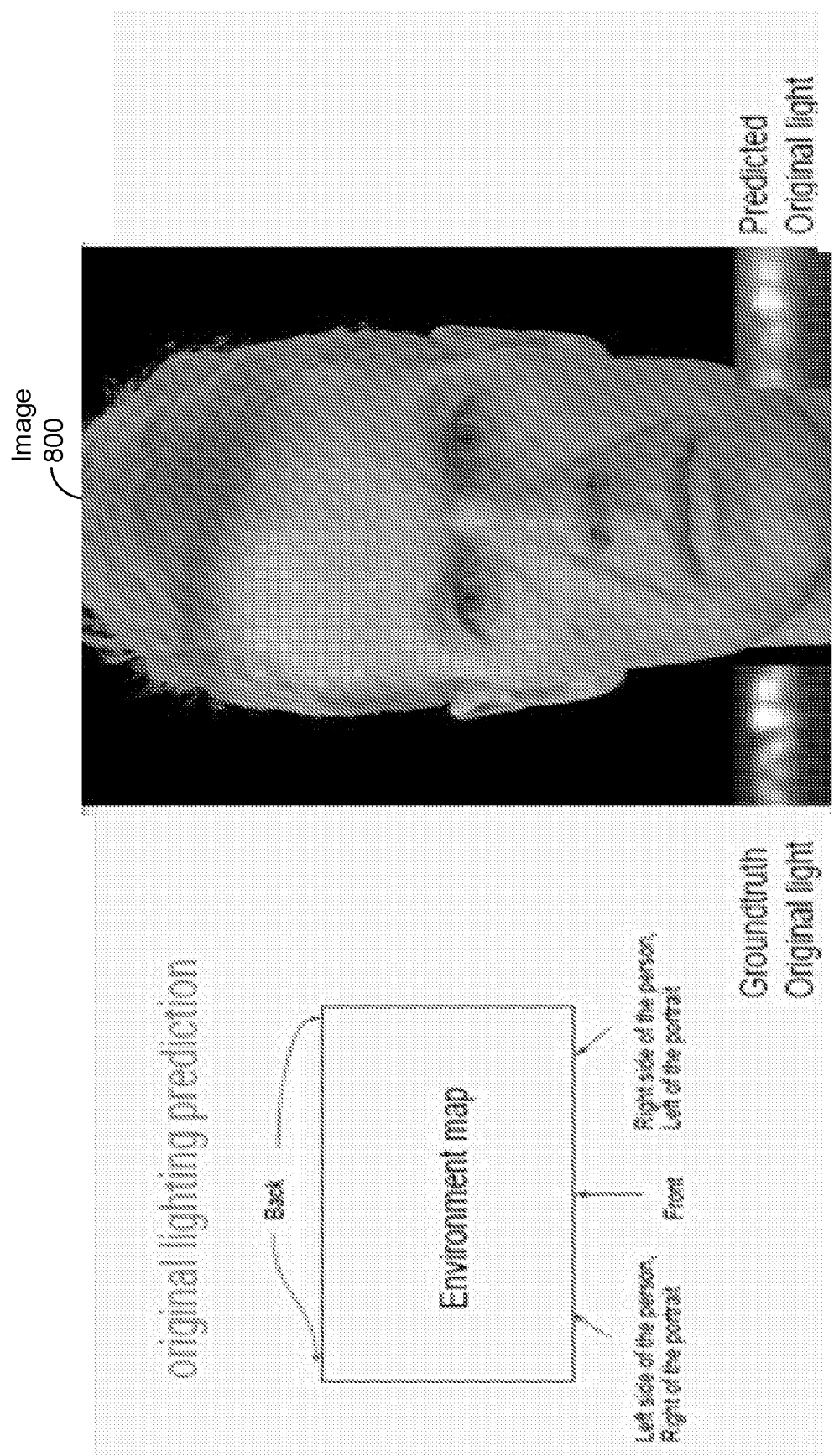
Figure 9:
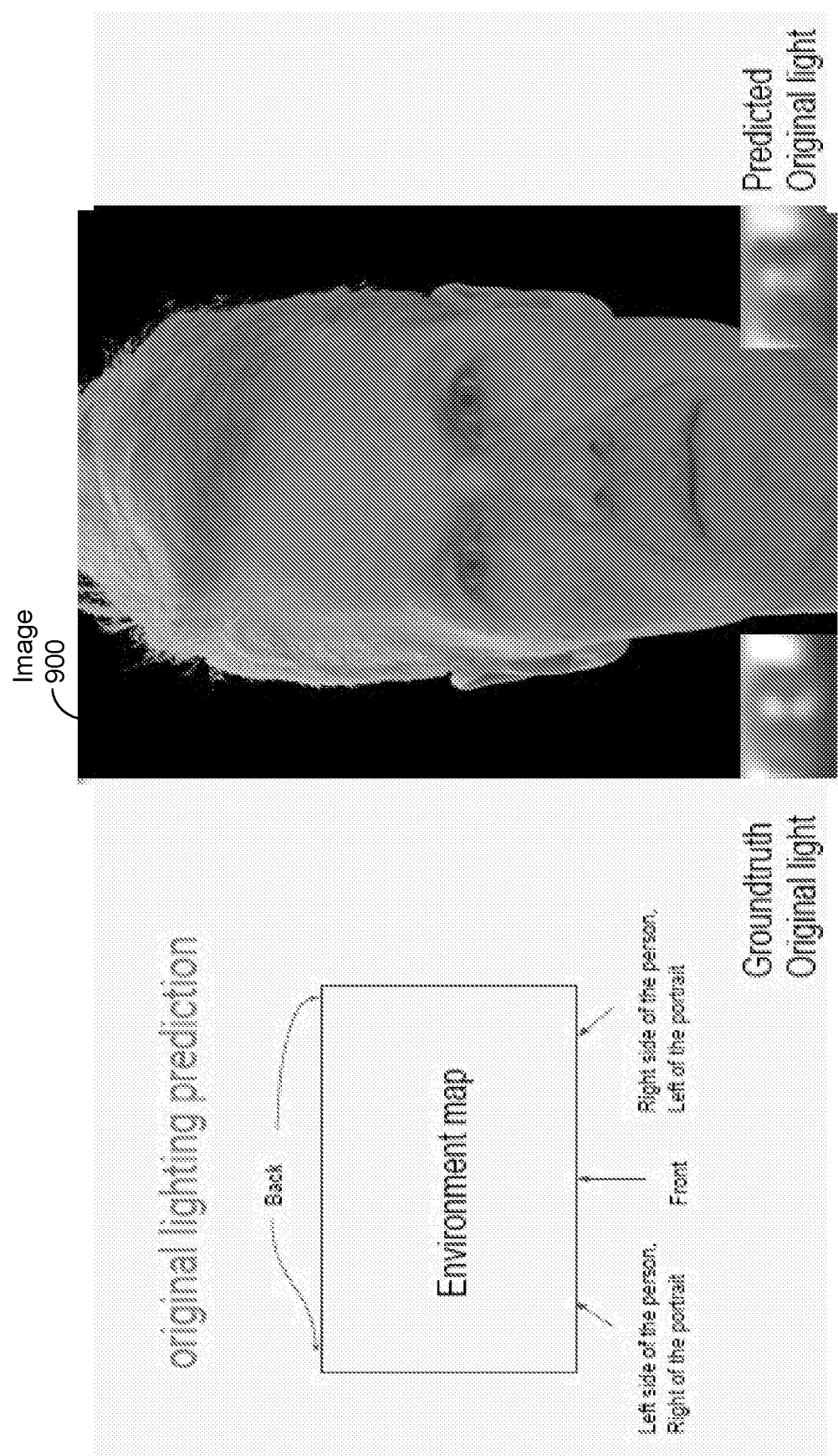

FIGS. 7-18 show example images of human faces generated by convolutional neural network 430, in accordance with example embodiments. In particular, FIGS. 7-9 show example images of human faces related to lighting model predictions made by convolutional neural network 430, and FIGS. 10-18 show example images of human faces related to target model predictions made by convolutional neural network 430. Overall, FIGS. 7-18 illustrate that convolutional neural network 430 can generate accurate predictions of lighting models and relighted images of human faces over a broad range of lighting environments.

FIG. 7 shows image 700 that was captured while being lighted by light modeled by "Groundtruth Original light" indicated at lower left of image 700. Convolutional neural network 430 predicted a lighting model illustrated by "Predicted Original light" at lower right of image 700. Both the Groundtruth Original light and the Predicted Original light depicted in FIG. 7 are based on an environment map shown at left of FIG. 7. The environment map indicates that an upper portion of both Groundtruth Original light and Predicted Original light relates to light from a back portion of an environment depicted in image 700 and that a lower portion of both Groundtruth Original light and Predicted Original light relates to light from a front portion of the environment depicted in image 700. The environment map also indicates that a left portion of both Groundtruth Original light and Predicted Original light relates to light on a left side of the face depicted in image 700, which corresponds to the right side of image 700 and that a right portion of both Groundtruth Original light and Predicted Original light relates to light on a right side of the face depicted in image 700, which corresponds to the left side of image 700. The same environment map depicted in and used for FIG. 7 is also depicted and used for lighting models shown in FIGS. 8-18.

FIG. 7 shows that both Groundtruth Original light and Predicted Original light of image 700 have bright portions at upper left, which indicates that most of the light of the environment of image 700 is both predicted to and actually comes from behind the face depicted in image 700 and lands on the left side of the face, which is shown in the right side of image 700. Image 700 confirms the prediction made by Predicted Original light, as image 700 is more brightly lit on the right side than on the left side.

FIG. 8 shows that a lower left portion of image 800 shows Groundtruth Original light for the image and a lower right portion of image 800 shows Predicted Original light for the image, where Predicted Original light for image 800 was generated by convolutional neural network 430. Both Groundtruth Original light and Predicted Original light for image 800 have bright portions at upper right, which indicates that most of the light of the environment of image 800 is both predicted to and actually comes from behind the face depicted in image 800 and lands on the right side of the face, which is shown in the left side of image 800. Image 800 confirms the prediction made by Predicted Original light, as image 800 is more brightly lit on the left side than on the right side.

FIG. 9 shows that a lower left portion of image 900 shows Groundtruth Original light for the image and a lower right portion of image 900 shows Predicted Original light for the image, where Predicted Original light for image 900 was generated by convolutional neural network 430. Both Groundtruth Original light and Predicted Original light for image 900 have a relatively-large bright portions at upper right and a relatively-small bright portion at upper left, which indicates that most of the light of the environment of image 900 is both predicted to and actually comes from two light sources: a larger light source that is behind the face depicted in image 900, the light from which lands on the right side of the face shown in the left side of image 900; and a smaller light source that is also behind the face depicted in image 900, the light from which light lands on the left side of the face shown in the right side of image 900. Image 900 confirms the prediction made by Predicted Original light, as image 900 is more brightly lit on the left side than on the right side as is image 800, but is more evenly lit across the face than image 800.

Figure 10:
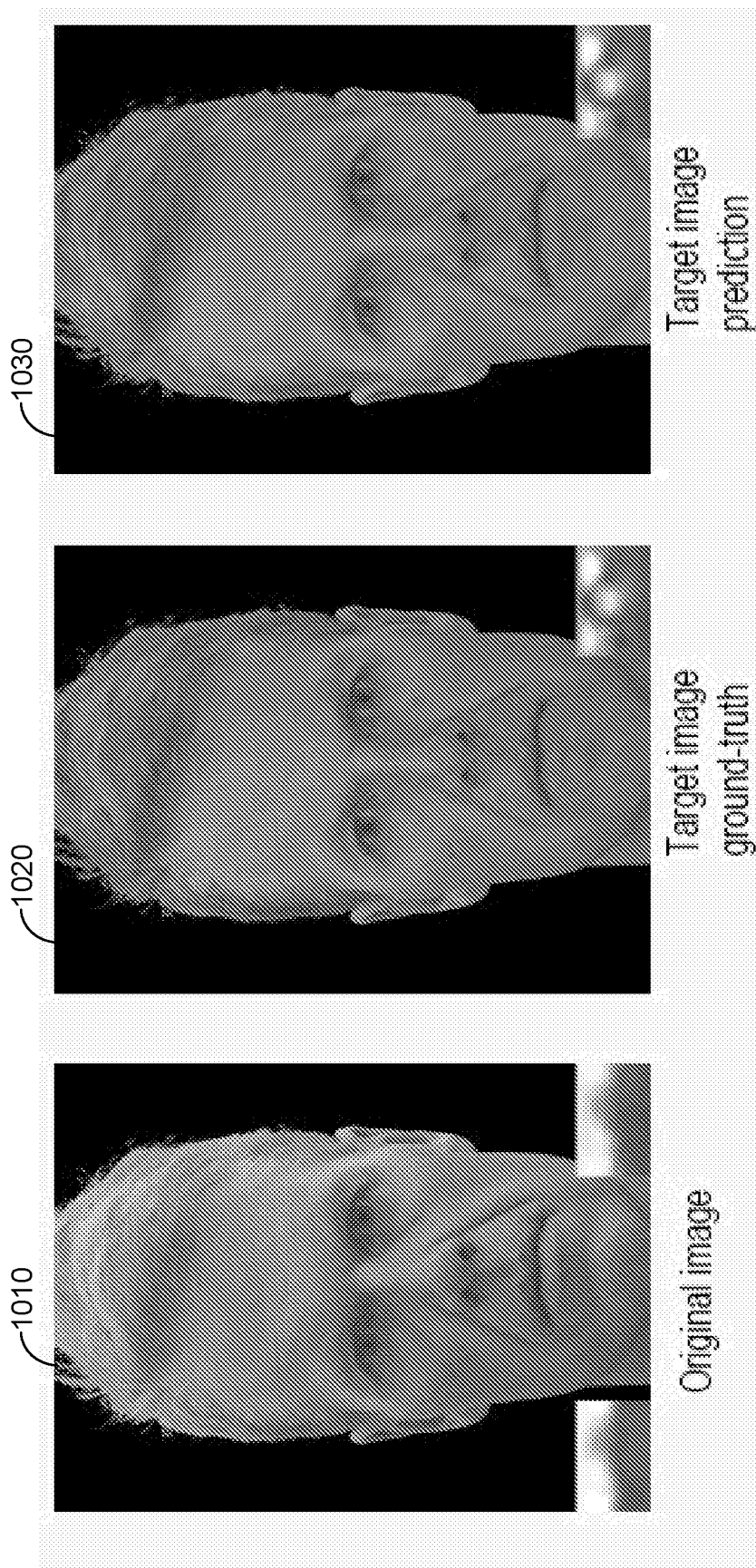

Each of FIGS. 10-18 shows a set of three images: an original image; a ground-truth target image with a corresponding target lighting model; and a predicted target image generated by a trained version of convolutional neural network 430 by applying the target lighting model to the original image. For example, FIG. 10 shows original image 1010, ground-truth target image 1020, and predicted target image 1030, where original image 1010 is shown with environment maps of original lighting models indicating that image 1010 was backlit with relatively uniform light. Both ground-truth target image 1020 and predicted target image 1030 are shown with environment maps of target lighting models showing three light sources, one of which is more forward in the environment than the light used for original image 1010. Both ground-truth target image 1020 and predicted target image 1030 show similar lighting reflected by the target lighting models shown in each respective image.

Figure 11:
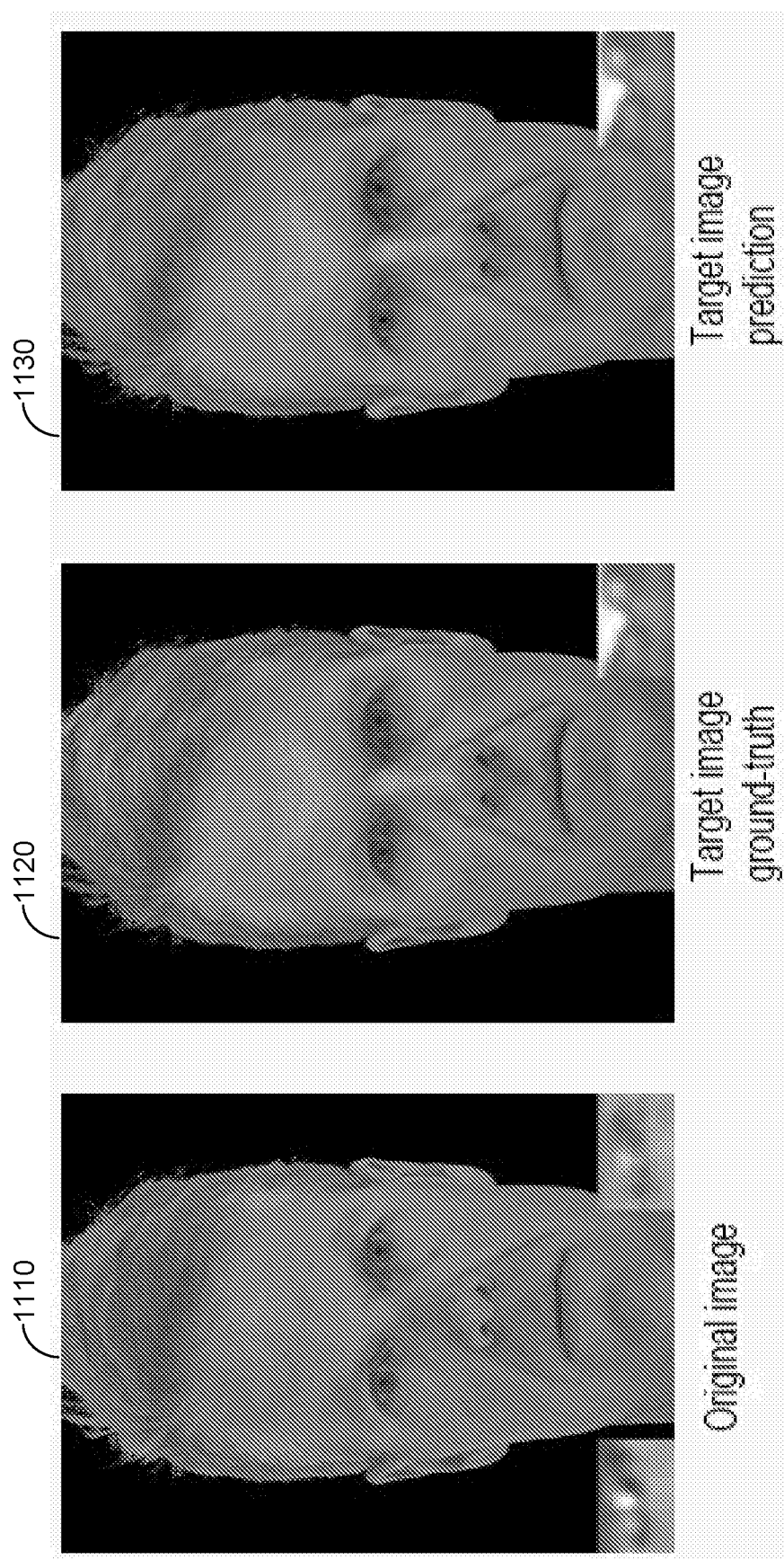

FIG. 11 shows original image 1110, ground-truth target image 1120, and predicted target image 1130, where original image 1110 is shown with environment maps of original lighting models indicating that image 1110 was backlit with relatively dim light with one relatively small light source near the face depicted in image 1110. Both ground-truth target image 1120 and predicted target image 1130 are shown with environment maps of target lighting models showing relatively bright back lighting in comparison with original image 1110. Both ground-truth target image 1120 and predicted target image 1130 show similar lighting that reflects the target lighting models shown in each respective image.

Figure 12:
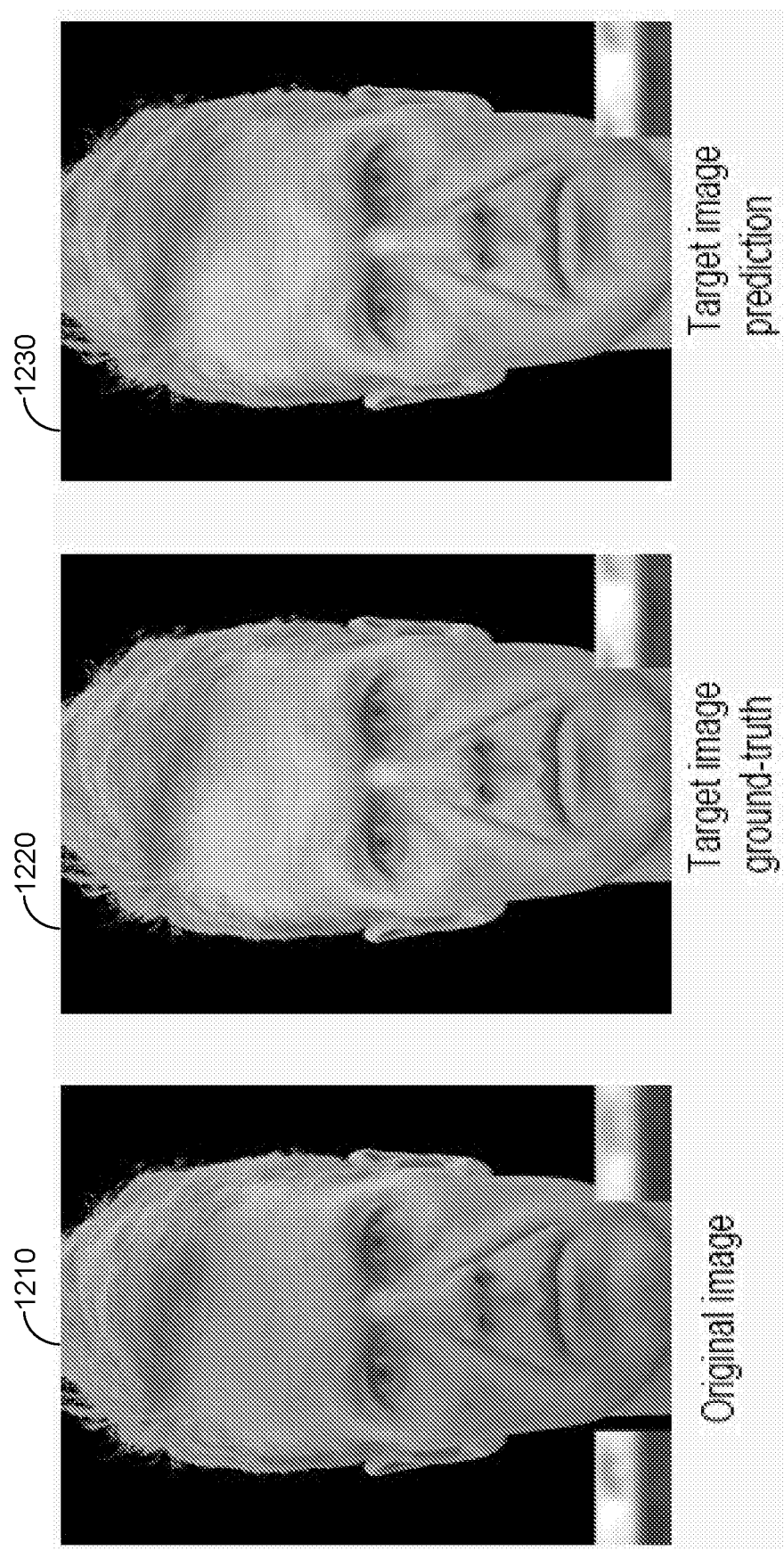

FIG. 12 shows original image 1210, ground-truth target image 1220, and predicted target image 1230, where original image 1210 is shown with environment maps of original lighting models indicating that image 1210 was backlit with light stronger on the left side of the depicted face (shown in the right side of image 1210) than on the right side of the depicted face (shown in the left side of image 1210). Both ground-truth target image 1220 and predicted target image 1230 are shown with environment maps of target lighting models showing one relatively large light source dominating the lighting environment. Both ground-truth target image 1220 and predicted target image 1230 show similar lighting that reflects the target lighting models shown in each respective image. However, predicted target image 1230 is slightly dimmer than target image 1220, perhaps reflecting the relatively-dim lighting of input original image 1210.

Figure 13:
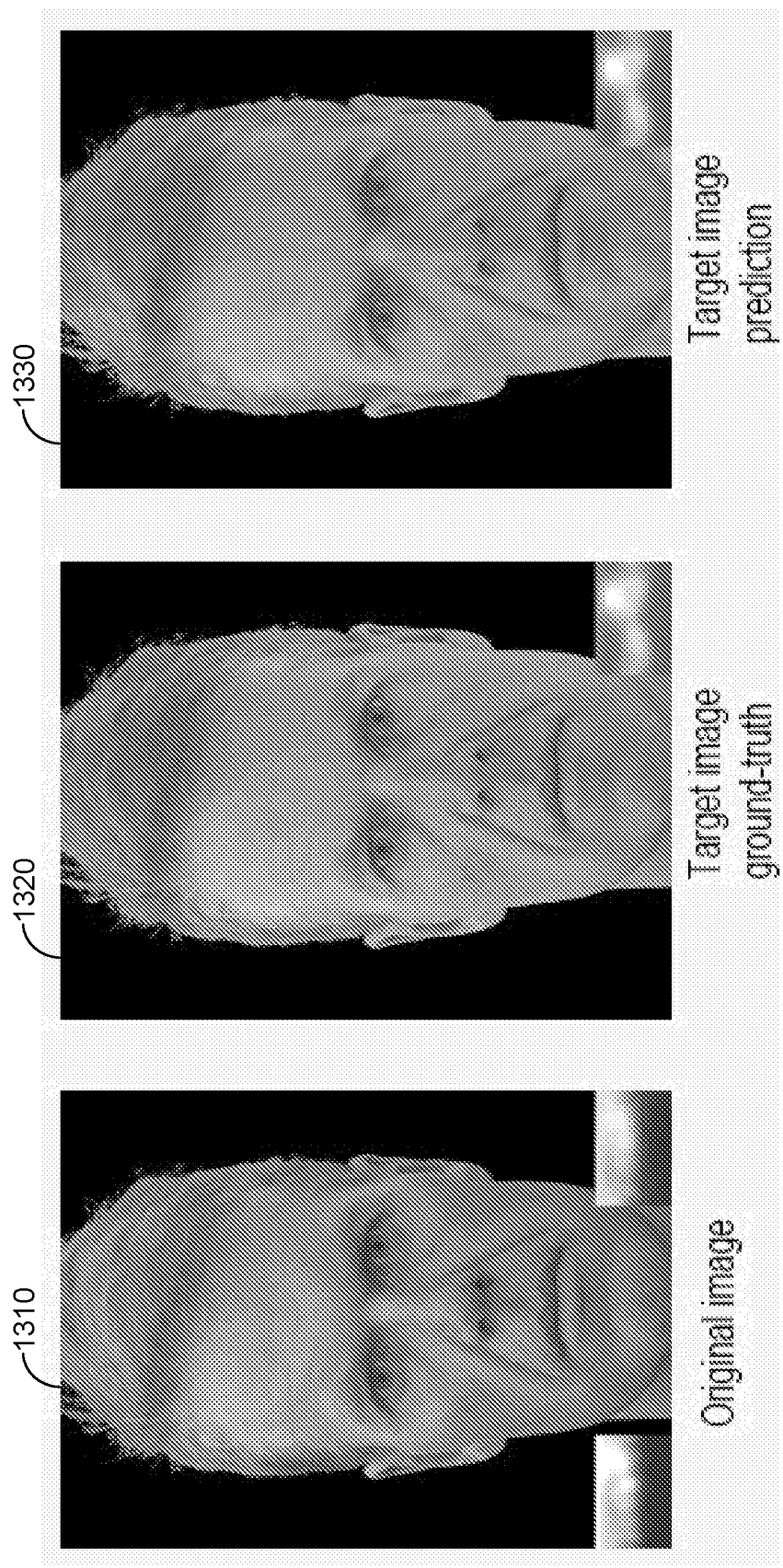

FIG. 13 shows original image 1310, ground-truth target image 1320, and predicted target image 1330, where original image 1310 is shown with environment maps of original lighting models indicating that image 1310 was backlit with relatively uniform light. Both ground-truth target image 1320 and predicted target image 1330 are shown with environment maps of target lighting models showing two light sources, the larger of which is on the right of the face depicted in image 1320. Both ground-truth target image 1320 and predicted target image 1330 show similar lighting that reflects the target lighting models shown in each respective image.

Figure 14:
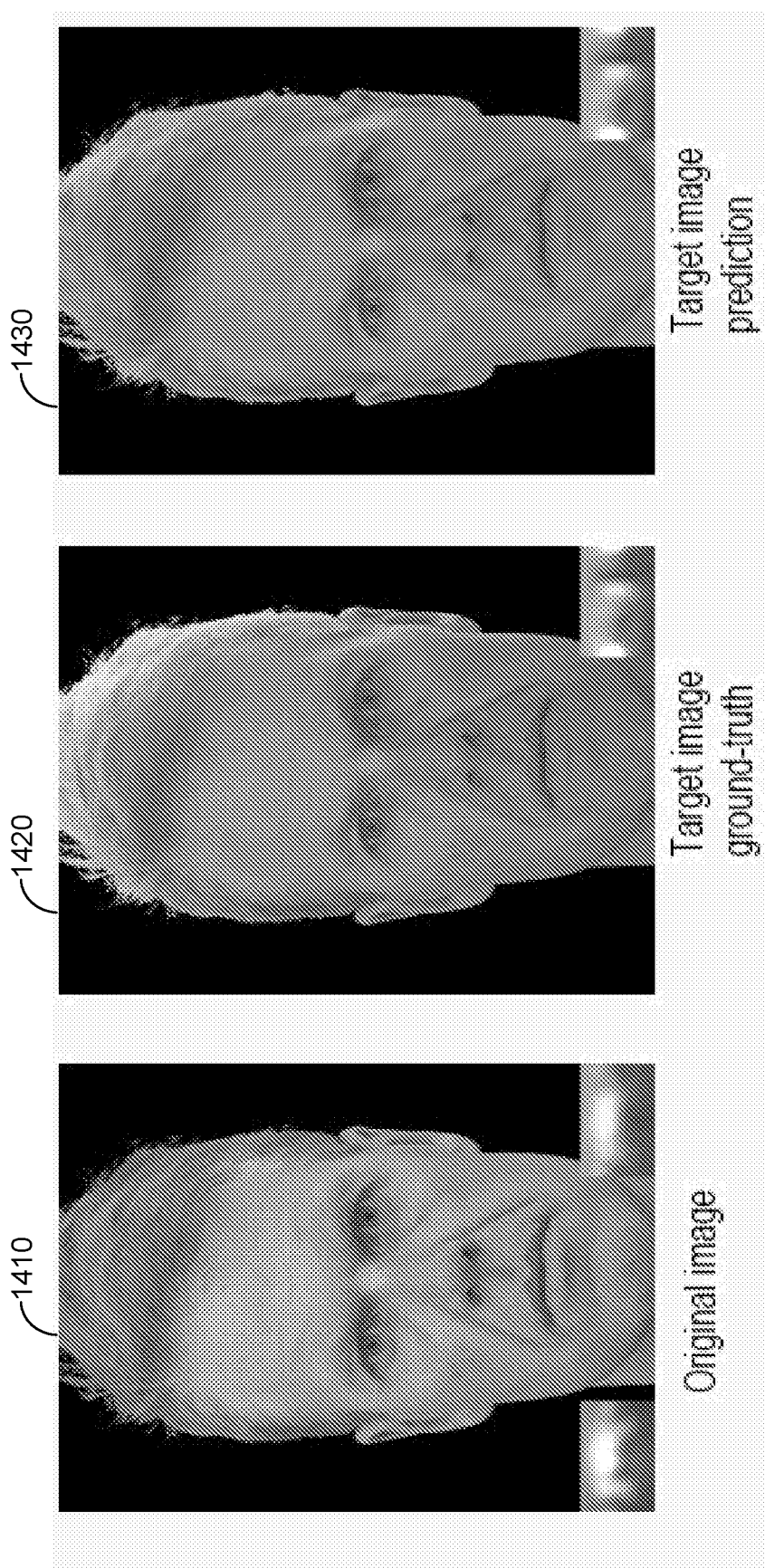

FIG. 14 shows original image 1410, ground-truth target image 1420, and predicted target image 1430, where original image 1410 is shown with environment maps of original lighting models indicating that image 1410 was backlit with one relatively large white light source. Both ground-truth target image 1420 and predicted target image 1430 are shown with environment maps of target lighting models showing three light sources, a relatively large white light source on the left of the face depicted in image 1420, a relatively small white light source on the right of the face depicted in image 1420, and a relatively large yellow light source centrally located in the lighting environment for image 1420. Both ground-truth target image 1420 and predicted target image 1430 show similar lighting that reflects the target lighting models shown in each respective image.

Figure 15:
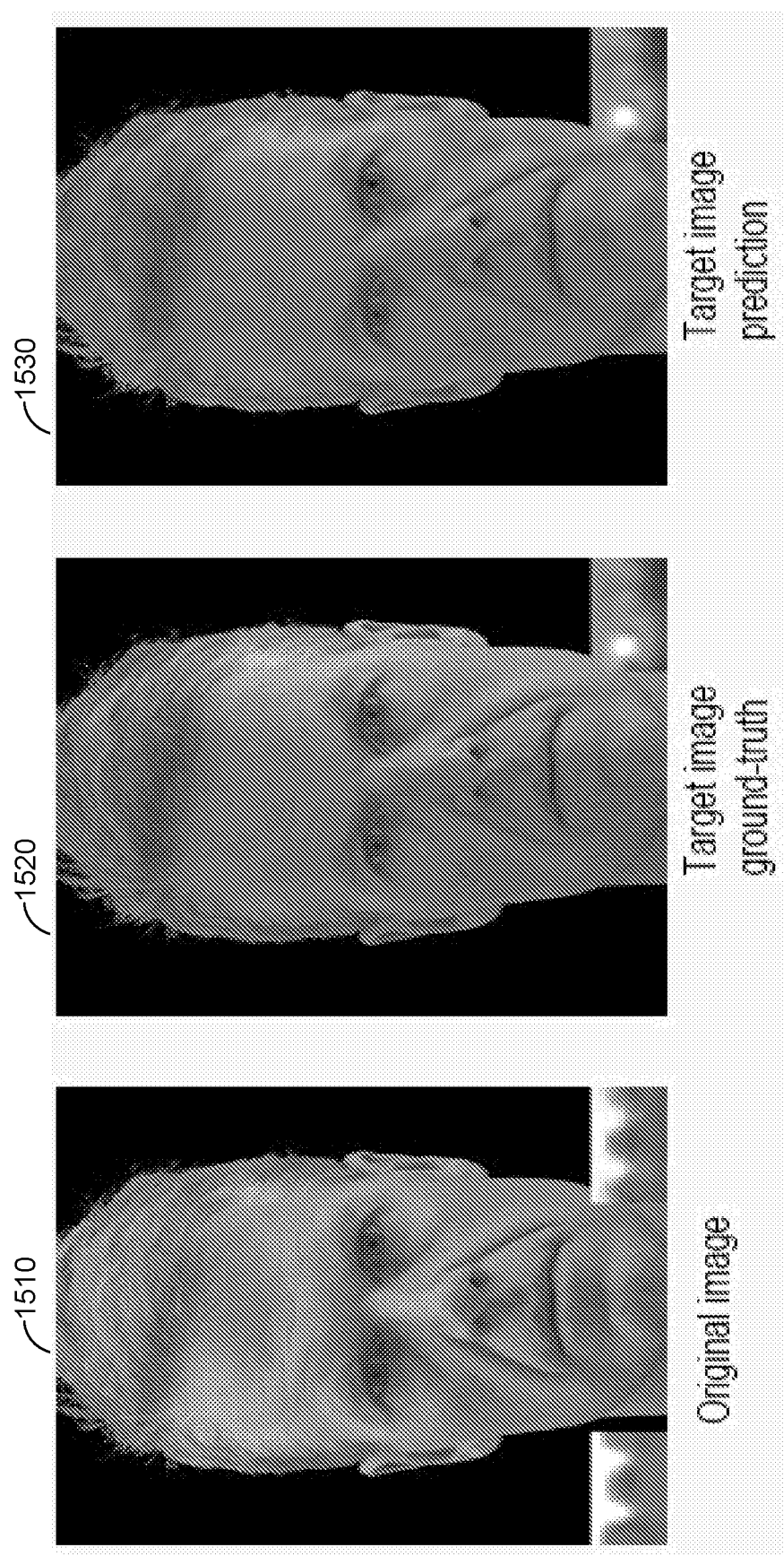

FIG. 15 shows original image 1510, ground-truth target image 1520, and predicted target image 1530, where original image 1510 is shown with environment maps of original lighting models indicating that image 1510 was backlit with relatively uniform light that approaches both the left and the right of the face depicted in image 1510. Both ground-truth target image 1520 and predicted target image 1530 are shown with environment maps of target lighting models showing one light source to the left of the face depicted in image 1520. Both ground-truth target image 1520 and predicted target image 1530 show similar lighting that reflects the target lighting models shown in each respective image. However, the lighting on the face depicted in image 1530 is dimmer than the lighting on the face depicted in image 1520.

Figure 16:
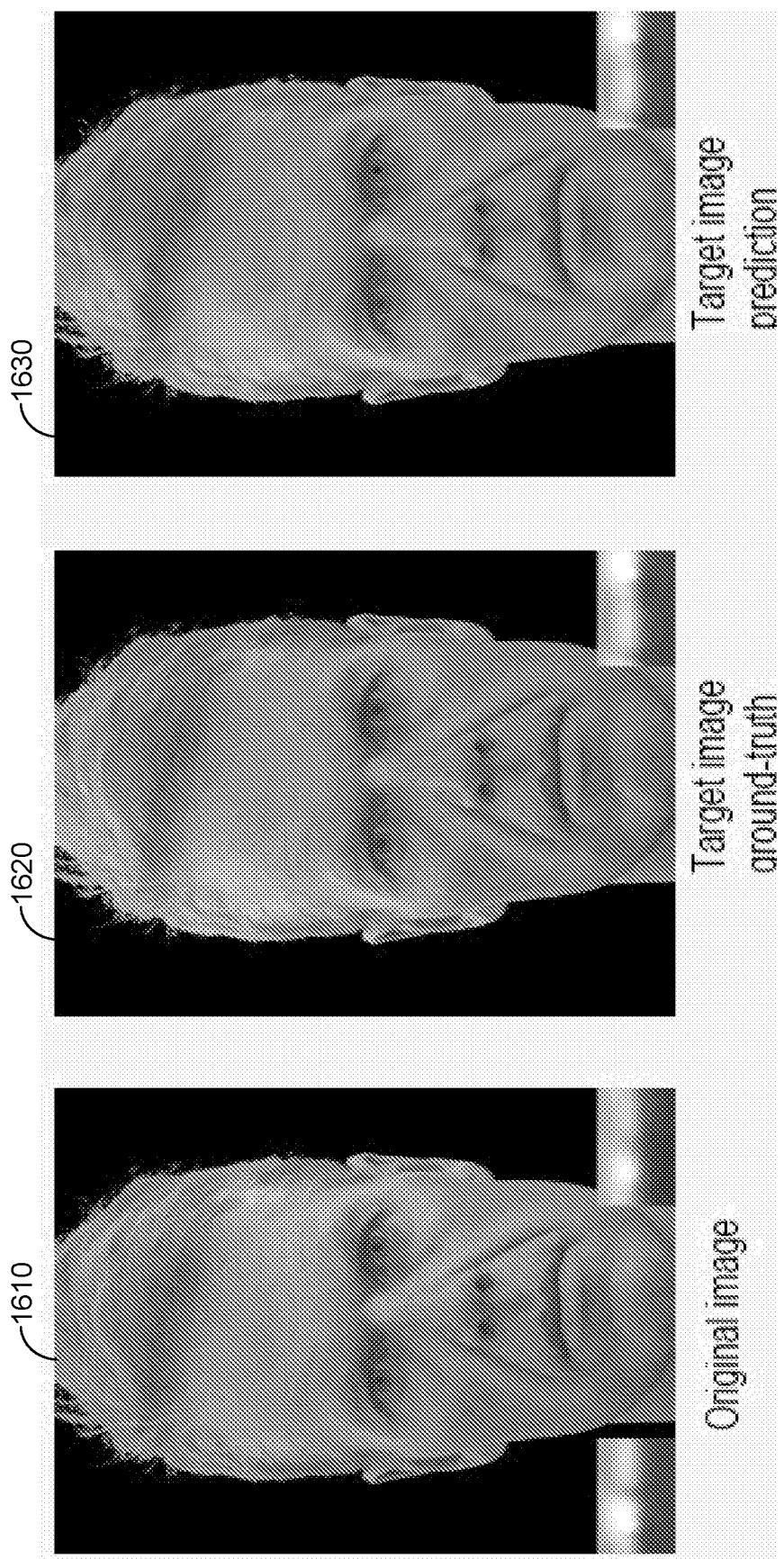

FIG. 16 shows original image 1610, ground-truth target image 1620, and predicted target image 1630, where original image 1610 is shown with environment maps of original lighting models indicating that image 1610 was mainly lighted by a light source on the left side of the face depicted in image 1610. Both ground-truth target image 1620 and predicted target image 1630 are shown with environment maps of target lighting models dominated by a relatively bright light source on the right side of the face depicted in image 1620. Both ground-truth target image 1620 and predicted target image 1630 show similar lighting that reflects the target lighting models shown in each respective image.

Figure 17:
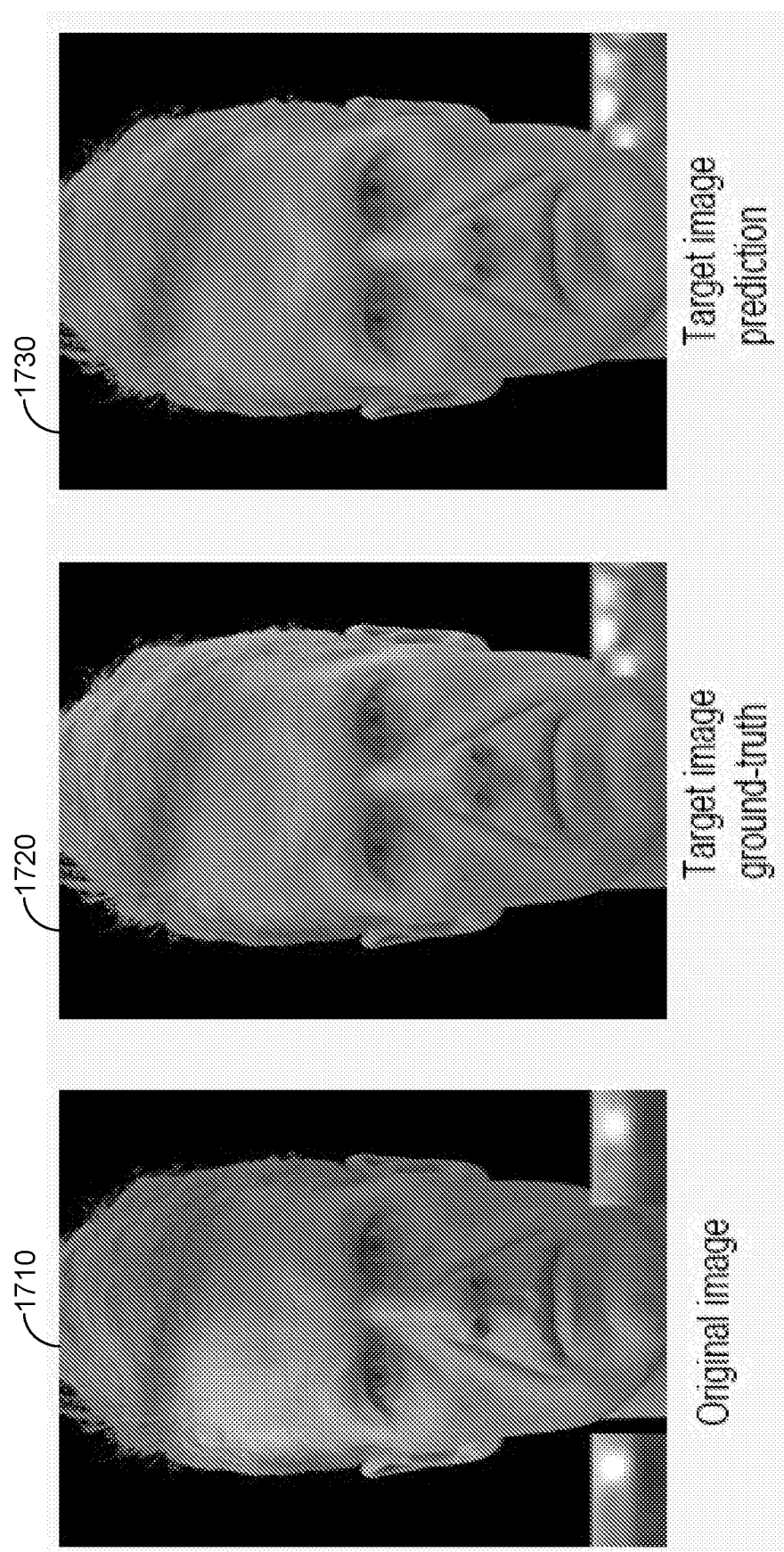

FIG. 17 shows original image 1710, ground-truth target image 1720, and predicted target image 1730, where original image 1710 is shown with environment maps of original lighting models indicating that image 1710 was mainly lighted by a light source on the right side of the face depicted in image 1710. Both ground-truth target image 1720 and predicted target image 1730 are shown with environment maps of target lighting models showing three light sources, two of which are relatively large for backlighting the face depicted in image 1720 from left and right and the third, relatively-small light source on the left side of the face depicted in image 1720. Both ground-truth target image 1720 and predicted target image 1730 show similar lighting that reflects the target lighting models shown in each respective image.

Figure 18:
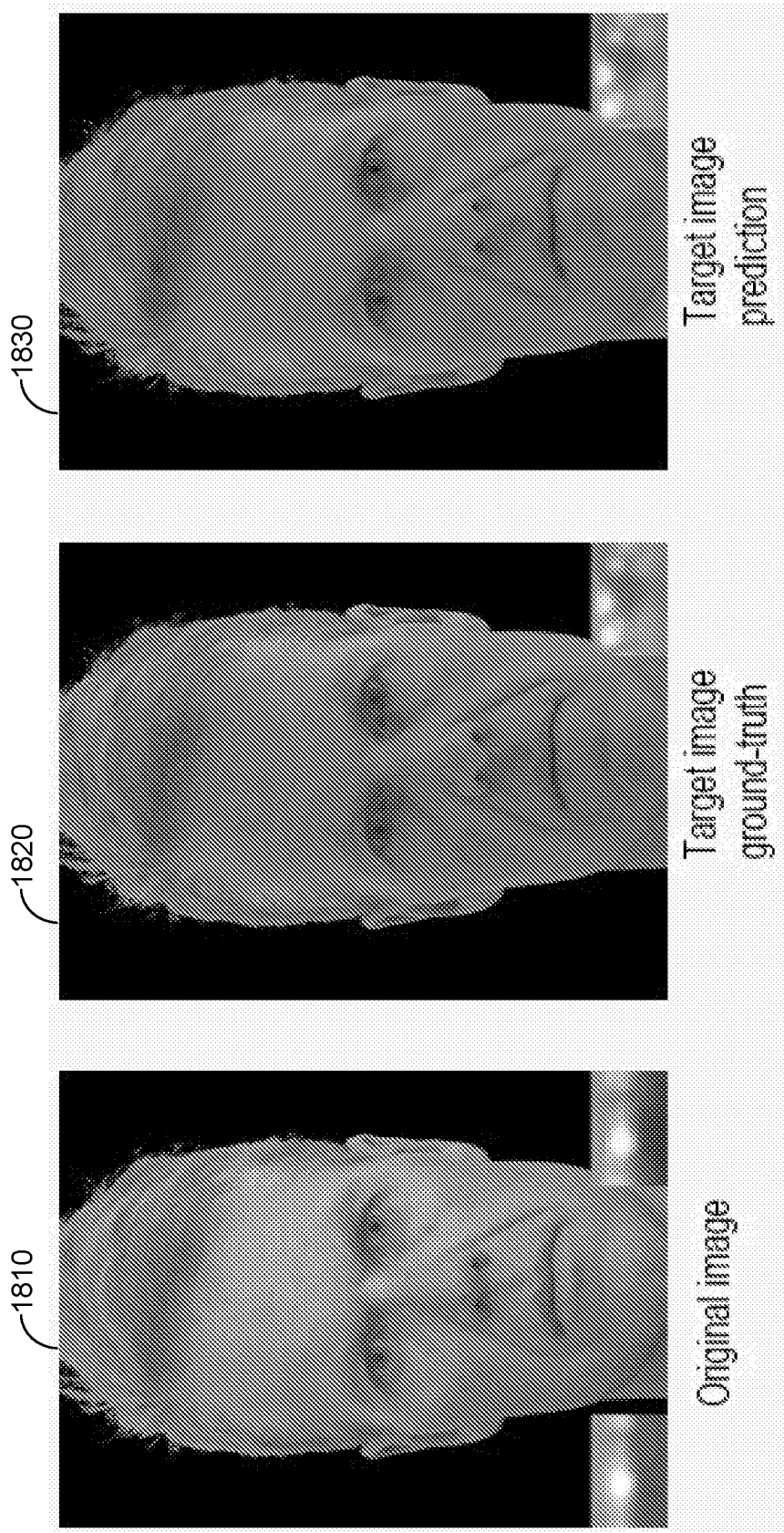

FIG. 18 shows original image 1810, ground-truth target image 1820, and predicted target image 1830, where original image 1810 is shown with environment maps of original lighting models indicating that image 1810 was lit mainly by one white light source that is relatively close to the face depicted in image 1810. Both ground-truth target image 1820 and predicted target image 1830 are shown with environment maps of target lighting models showing three yellow light sources. Two of the light sources are relatively large and backlight the face depicted in image 1820 mainly from the left side. The other light source is relatively small and located to the right and near the face depicted in image 1820. Both ground-truth target image 1820 and predicted target image 1830 show similar yellow-tinted lighting that reflects the target lighting models shown in each respective image.

Training Machine Learning Models for Generating Inferences/Predictions

Figure 19:
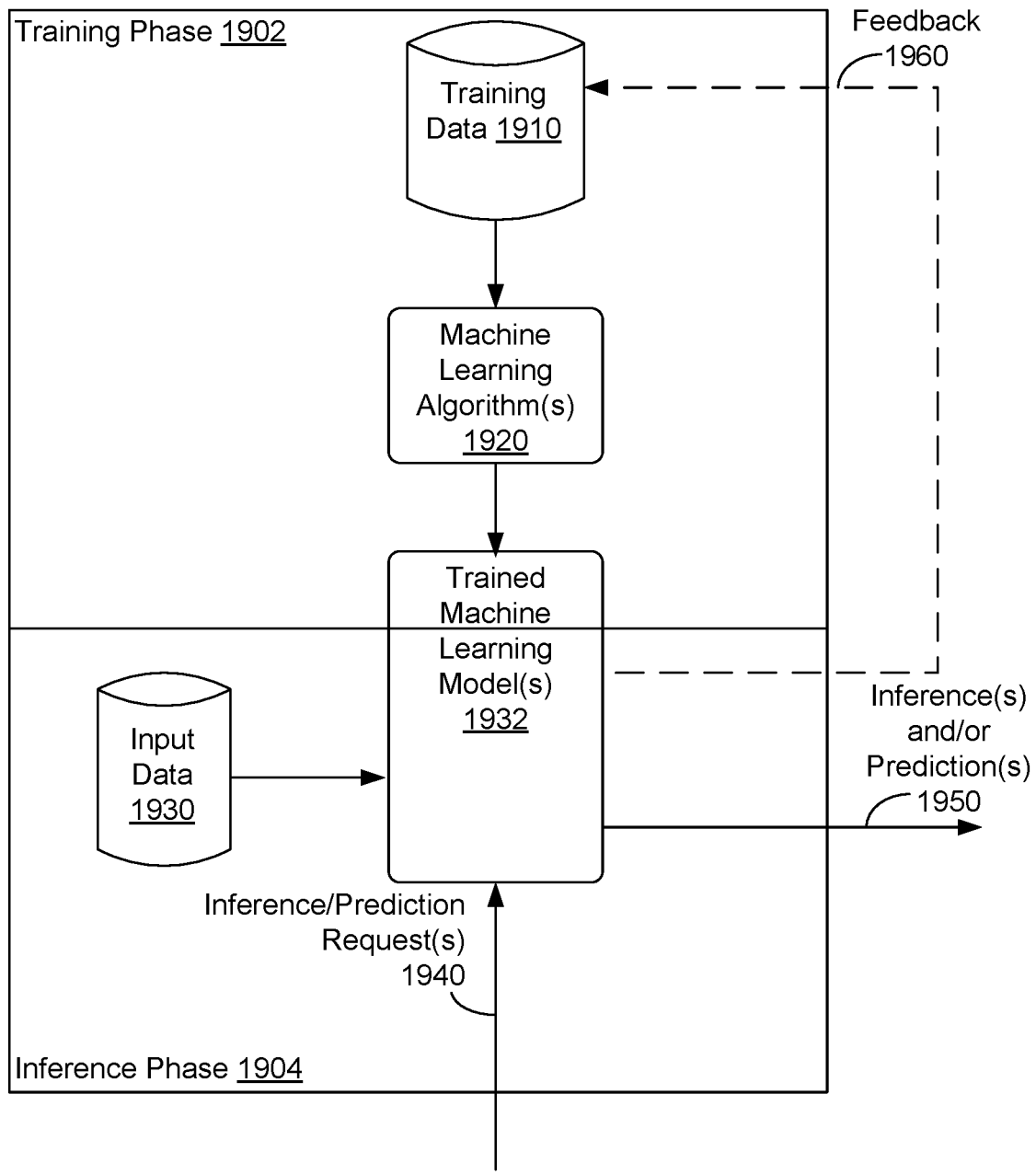
FIG. 19 is a diagram illustrating training and inference phases of a machine learning model, in accordance with example embodiments.

FIG. 19 shows diagram 1900 illustrating a training phase 1902 and an inference phase 1904 of trained machine learning model(s) 1932, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 19 shows training phase 1902 where one or more machine learning algorithms 1920 are being trained on training data 1910 to become trained machine learning model 1932. Then, during inference phase 1904, trained machine learning model 1932 can receive input data 1930 and one or more inference/prediction requests 1940 (perhaps as part of input data 1930) and responsively provide as an output one or more inferences and/or predictions 1950.

As such, trained machine learning model(s) 1932 can include one or more models of one or more machine learning algorithms 1920. Machine learning algorithm(s) 1920 may include, but are not limited to: an artificial neural network (e.g., a herein-described convolutional neural network using herein-described confidence learning techniques, a recurrent neural network), a Bayesian network, a hidden Markov model, a Markov decision process, a logistic regression function, a support vector machine, a suitable statistical machine learning algorithm, and/or a heuristic machine learning system. Machine learning algorithm(s) 1920 may be supervised or unsupervised, and may implement any suitable combination of online and offline learning.

In some examples, machine learning algorithm(s) 1920 and/or trained machine learning model(s) 1932 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1920 and/or trained machine learning model(s) 1932. In some examples, trained machine learning model(s) 1932 can be trained, reside and execute to provide inferences on a particular computing device, and/or otherwise can make inferences for the particular computing device.

During training phase 1902, machine learning algorithm(s) 1920 can be trained by providing at least training data 1910 as training input using unsupervised, supervised, semi-supervised, and/or reinforcement learning techniques. Unsupervised learning involves providing a portion (or all) of training data 1910 to machine learning algorithm(s) 1920 and machine learning algorithm(s) 1920 determining one or more output inferences based on the provided portion (or all) of training data 1910. Supervised learning involves providing a portion of training data 1910 to machine learning algorithm(s) 1920, with machine learning algorithm(s) 1920 determining one or more output inferences based on the provided portion of training data 1910, and the output inference(s) are either accepted or corrected based on correct results associated with training data 1910. In some examples, supervised learning of machine learning algorithm(s) 1920 can be governed by a set of rules and/or a set of labels for the training input, and the set of rules and/or set of labels may be used to correct inferences of machine learning algorithm(s) 1920.

Semi-supervised learning involves having correct results for part, but not all, of training data 1910. During semi-supervised learning, supervised learning is used for a portion of training data 1910 having correct results, and unsupervised learning is used for a portion of training data 1910 not having correct results. Reinforcement learning involves machine learning algorithm(s) 1920 receiving a reward signal regarding a prior inference, where the reward signal can be a numerical value. During reinforcement learning, machine learning algorithm(s) 1920 can output an inference and receive a reward signal in response, where machine learning algorithm(s) 1920 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1920 and/or trained machine learning model(s) 1932 can be trained using other machine learning techniques, including but not limited to, incremental learning and curriculum learning.

In some examples, machine learning algorithm(s) 1920 and/or trained machine learning model(s) 1932 can use transfer learning techniques. For example, transfer learning techniques can involve trained machine learning model(s) 1932 being pre-trained on one set of data and additionally trained using training data 1910. More particularly, machine learning algorithm(s) 1920 can be pre-trained on data from one or more computing devices and a resulting trained machine learning model provided to computing device CD1, where CD1 is intended to execute the trained machine learning model during inference phase 1904. Then, during training phase 1902, the pre-trained machine learning model can be additionally trained using training data 1910, where training data 1910 can be derived from kernel and non-kernel data of computing device CD1. This further training of the machine learning algorithm(s) 1920 and/or the pre-trained trained machine learning model using training data 1910 of CD1's data can be performed using either supervised or unsupervised learning. Once machine learning algorithm(s) 1920 and/or the pre-trained machine learning model has been trained on at least training data 1910, training phase 1902 can be completed. The trained resulting machine learning model can be utilized as at least one of trained machine learning model(s) 1932.

In particular, once training phase 1902 has been completed, trained machine learning model(s) 1932 can be provided to a computing device, if not already on the computing device. Inference phase 1904 can begin after trained machine learning model(s) 1932 are provided to computing device CD1.

During inference phase 1904, trained machine learning model(s) 1932 can receive input data 1930 and generate and output one or more corresponding inferences and/or predictions 1950 about input data 1930. As such, input data 1930 can be used as an input to trained machine learning model(s) 1932 for providing corresponding inference(s) and/or prediction(s) 1950 to kernel components and non-kernel components. For example, trained machine learning model(s) 1932 can generate inference(s) and/or prediction(s) 1950 in response to one or more inference/prediction requests 1940. In some examples, trained machine learning model(s) 1932 can be executed by a portion of other software. For example, trained machine learning model(s) 1932 can be executed by an inference or prediction daemon to be readily available to provide inferences and/or predictions upon request. Input data 1930 can include data from computing device CD1 executing trained machine learning model(s) 1932 and/or input data from one or more computing devices other than CD1.

Input data 1930 can include a collection of images provided by one or more sources. The collection of images can include images of an object, such as a human face, where the images of the human face are taken under different lighting conditions, images of multiple objects, images resident on computing device CD1, and/or other images. Other types of input data are possible as well.

Inference(s) and/or prediction(s) 1950 can include output images, output lighting models, numerical values, and/or other output data produced by trained machine learning model(s) 1932 operating on input data 1930 (and training data 1910). In some examples, trained machine learning model(s) 1932 can use output inference(s) and/or prediction(s) 1950 as input feedback 1960. Trained machine learning model(s) 1932 can also rely on past inferences as inputs for generating new inferences.

Convolutional neural network 430 can be an example of machine learning algorithm(s) 1920. After training, the trained version of convolutional neural network 430 can be an example of trained machine learning model(s) 1932. In this approach, an example of inference/prediction request(s) 1940 can be a request to apply a particular lighting model to an input image of an object and a corresponding example of inferences and/or prediction(s) 1950 can be an output image that predicts application of the particular lighting model to the input image.

In some examples, one computing device CD_SOLO can include the trained version of convolutional neural network 430, perhaps after training convolutional neural network 430. Then, computing device CD_SOLO can receive requests to apply particular lighting models to corresponding input images, and use the trained version of convolutional neural network 430 to generate output images that predict application of the particular lighting models to the input images. In some of these examples, the requests for output images received by CD_SOLO that predict application of the particular lighting models to the input images can include or be replaced by requests for original lighting models, each of which can models lighting that lighted an corresponding input image. Then, CD_SOLO can use the trained version of convolutional neural network 430 to generate output images and/or the original lighting models as requested.

In some examples, two or more computing devices CD_CLI and CD_SRV can be used to provide output images; e.g., a first computing device CD_CLI can generate and send requests to apply particular lighting models to corresponding input images to a second computing device CD_SRV. Then, CD_SRV can use the trained version of convolutional neural network 430, perhaps after training convolutional neural network 430, to generate output images that predict application of the particular lighting models to the input images, and respond to the requests from CD_CLI for the output images. Then, upon reception of responses to the requests, CD_CLI can provide the requested output images (e.g., using a user interface and/or a display, a printed copy, an electronic communication, etc.). In some examples, the requests for output images that predict application of the particular lighting models to the input images can include or be replaced by requests for original lighting models, each of which can models lighting that lighted an corresponding input image. Then, CD_SRV can use the trained version of convolutional neural network 430 to generate output images and/or the original lighting models as requested. Other examples for generating output images that predict application of the particular lighting models to the input images and/or for generating original lighting models using the trained version of convolutional neural network 430 are possible as well.

Example Data Network

Figure 20:
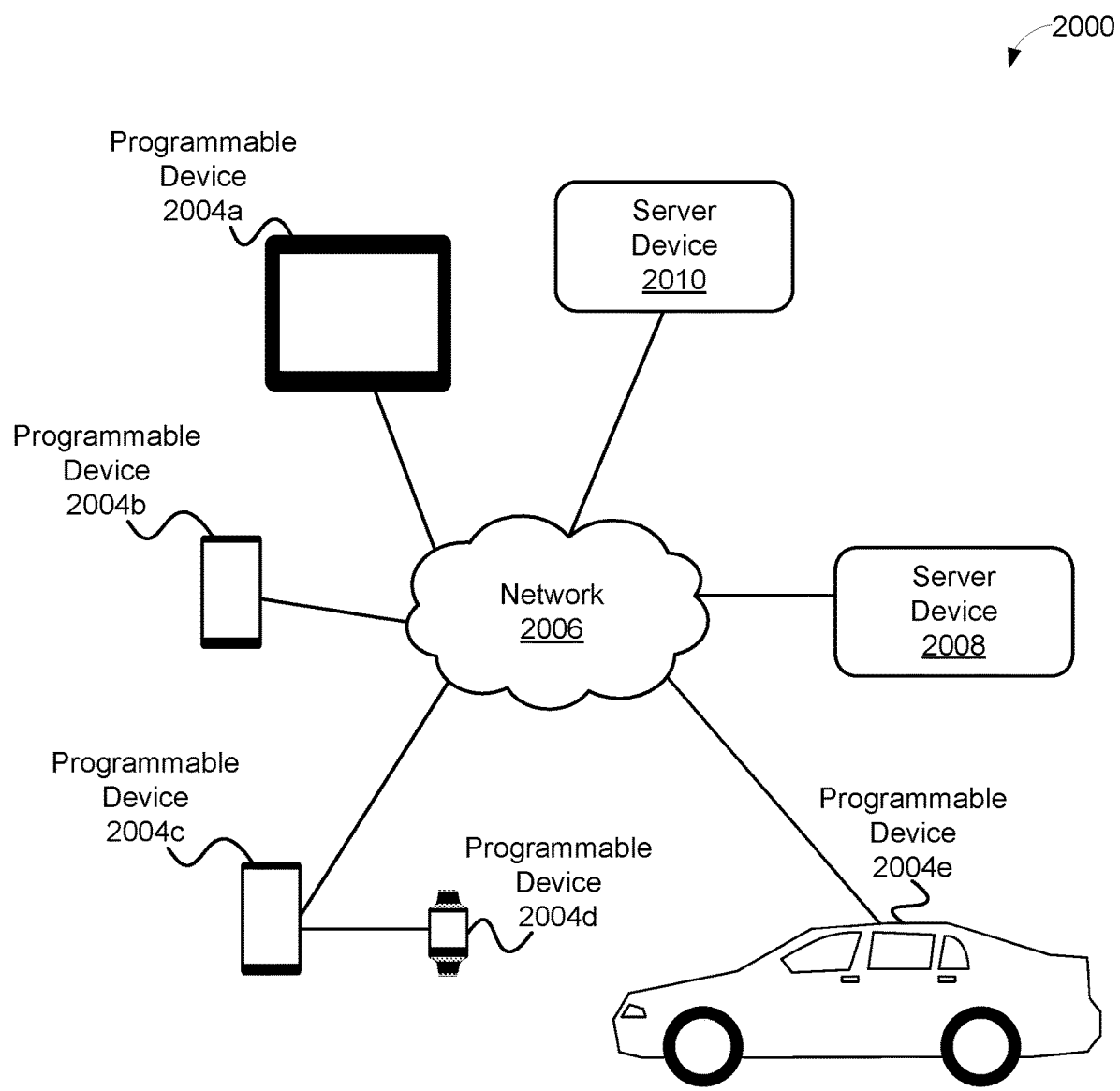
FIG. 20 depicts a distributed computing architecture, in accordance with example embodiments.

FIG. 20 depicts a distributed computing architecture 2000, in accordance with example embodiments. Distributed computing architecture 2000 includes server devices 2008, 2010 that are configured to communicate, via network 2006, with programmable devices 2004a, 2004b, 2004c, 2004d, 2004e. Network 2006 may correspond to a local area network (LAN), a wide area network (WAN), a WLAN, a WWAN, a corporate intranet, the public Internet, or any other type of network configured to provide a communications path between networked computing devices. Network 2006 may also correspond to a combination of one or more LANs, WANs, corporate intranets, and/or the public Internet.

Although FIG. 20 only shows five programmable devices, distributed application architectures may serve tens, hundreds, or thousands of programmable devices. Moreover, programmable devices 2004a, 2004b, 2004c, 2004d, 2004e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 2004a, 2004b, 2004c, 2004e, programmable devices can be directly connected to network 2006. In other examples, such as illustrated by programmable device 2004d, programmable devices can be indirectly connected to network 2006 via an associated computing device, such as programmable device 2004c. In this example, programmable device 2004c can act as an associated computing device to pass electronic communications between programmable device 2004d and network 2006. In other examples, such as illustrated by programmable device 2004e, a computing device can be part of and/or inside a vehicle, such as a car, a truck, a bus, a boat or ship, an airplane, etc. In other examples not shown in FIG. 20, a programmable device can be both directly and indirectly connected to network 2006.

Server devices 2008, 2010 can be configured to perform one or more services, as requested by programmable devices 2004a-2004e. For example, server device 2008 and/or 2010 can provide content to programmable devices 2004a-2004e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 2008 and/or 2010 can provide programmable devices 2004a-2004e with access to software for database, search, computation, graphical, audio, video, World Wide Web/Internet utilization, and/or other functions. Many other examples of server devices are possible as well.

Computing Device Architecture

Figure 21:
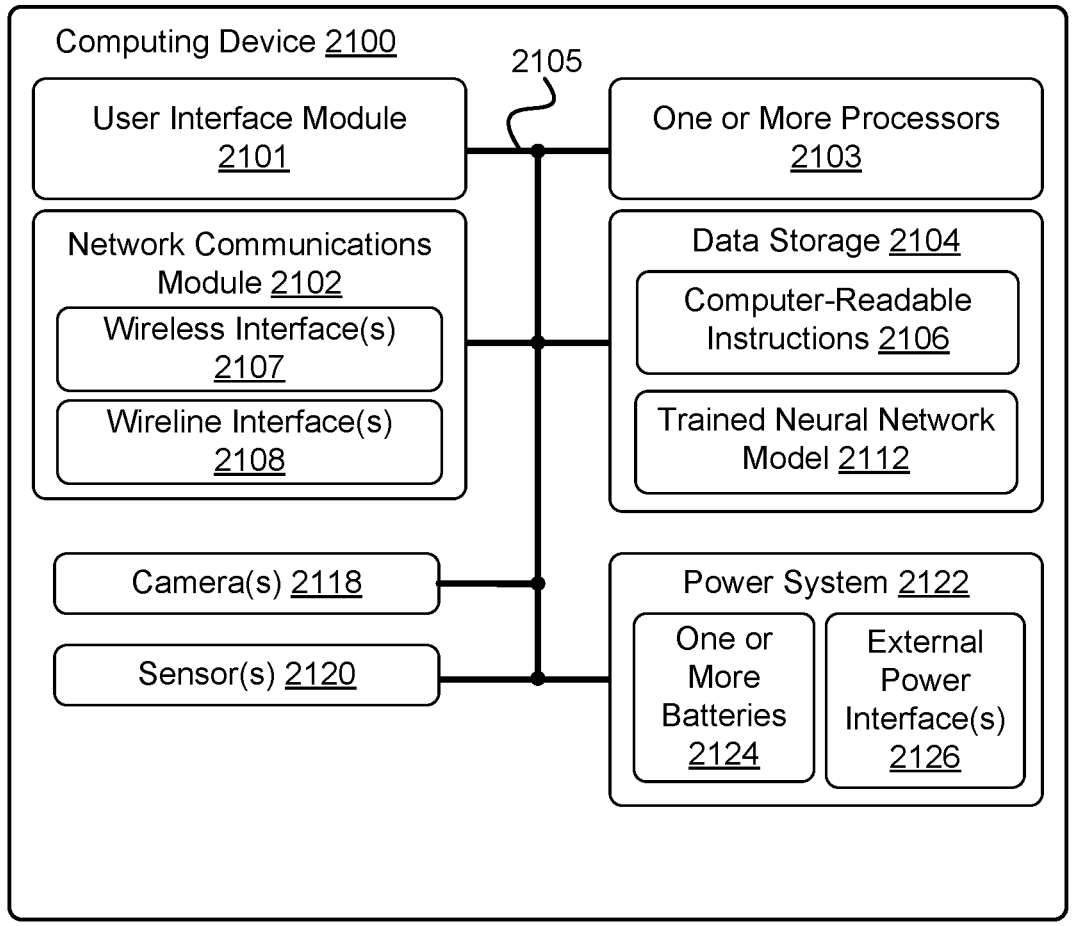
FIG. 21 is a block diagram of a computing device, in accordance with example embodiments.

FIG. 21 is a block diagram of an example computing device 2100, in accordance with example embodiments. In particular, computing device 2100 shown in FIG. 21 can be configured to perform at least one function of and/or related to a convolutional neural network, confidence learning, a predicted target image, a predicted original lighting model, convolutional neural network 430, confidence learning 630, and/or method 2300.

Computing device 2100 may include a user interface module 2101, a network communications module 2102, one or more processors 2103, data storage 2104, one or more cameras 2118, one or more sensors 2120, and power system 2122, all of which may be linked together via a system bus, network, or other connection mechanism 2105.

User interface module 2101 can be operable to send data to and/or receive data from external user input/output devices. For example, user interface module 2101 can be configured to send and/or receive data to and/or from user input devices such as a touch screen, a computer mouse, a keyboard, a keypad, a touch pad, a track ball, a joystick, a voice recognition module, and/or other similar devices. User interface module 2101 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 2101 can also be configured to generate audible outputs, with devices such as a speaker, speaker jack, audio output port, audio output device, earphones, and/or other similar devices. User interface module 2101 can further be configured with one or more haptic devices that can generate haptic outputs, such as vibrations and/or other outputs detectable by touch and/or physical contact with computing device 2100. In some examples, user interface module 2101 can be used to provide a graphical user interface (GUI) for utilizing computing device 2100.

Network communications module 2102 can include one or more devices that provide one or more wireless interfaces 2107 and/or one or more wireline interfaces 2108 that are configurable to communicate via a network. Wireless interface(s) 2107 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 2108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 2102 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 2103 can include one or more general purpose processors, and/or one or more special purpose processors (e.g., digital signal processors, tensor processing units (TPUs), graphics processing units (GPUs), application specific integrated circuits, etc.). One or more processors 2103 can be configured to execute computer-readable instructions 2106 that are contained in data storage 2104 and/or other instructions as described herein.

Data storage 2104 can include one or more non-transitory computer-readable storage media that can be read and/or accessed by at least one of one or more processors 2103. The one or more computer-readable storage media can include volatile and/or non-volatile storage components, such as optical, magnetic, organic or other memory or disc storage, which can be integrated in whole or in part with at least one of one or more processors 2103. In some examples, data storage 2104 can be implemented using a single physical device (e.g., one optical, magnetic, organic or other memory or disc storage unit), while in other examples, data storage 2104 can be implemented using two or more physical devices.

Data storage 2104 can include computer-readable instructions 2106 and perhaps additional data. In some examples, data storage 2104 can include storage required to perform at least part of the herein-described methods, scenarios, and techniques and/or at least part of the functionality of the herein-described devices and networks. In some examples, data storage 2104 can include storage for a trained neural network model 2112 (e.g., a model of a trained convolutional neural network such as convolutional neural network 430). In particular of these examples, computer-readable instructions 2106 can include instructions that, when executed by processor(s) 2103, enable computing device 2100 to provide for some or all of the functionality of trained neural network model 2112.

In some examples, computing device 2100 can include one or more cameras 2118. Camera(s) 2118 can include one or more image capture devices, such as still and/or video cameras, equipped to capture light and record the captured light in one or more images; that is, camera(s) 2118 can generate image(s) of captured light. The one or more images can be one or more still images and/or one or more images utilized in video imagery. Camera(s) 2118 can capture light and/or electromagnetic radiation emitted as visible light, infrared radiation, ultraviolet light, and/or as one or more other frequencies of light.

In some examples, computing device 2100 can include one or more sensors 2120. Sensors 2120 can be configured to measure conditions within computing device 2100 and/or conditions in an environment of computing device 2100 and provide data about these conditions. For example, sensors 2120 can include one or more of: (i) sensors for obtaining data about computing device 2100, such as, but not limited to, a thermometer for measuring a temperature of computing device 2100, a battery sensor for measuring power of one or more batteries of power system 2122, and/or other sensors measuring conditions of computing device 2100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 2100, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 2100, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 2100, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 2120 are possible as well.

Power system 2122 can include one or more batteries 2124 and/or one or more external power interfaces 2126 for providing electrical power to computing device 2100. Each battery of the one or more batteries 2124 can, when electrically coupled to the computing device 2100, act as a source of stored electrical power for computing device 2100. One or more batteries 2124 of power system 2122 can be configured to be portable. Some or all of one or more batteries 2124 can be readily removable from computing device 2100. In other examples, some or all of one or more batteries 2124 can be internal to computing device 2100, and so may not be readily removable from computing device 2100. Some or all of one or more batteries 2124 can be rechargeable. For example, a rechargeable battery can be recharged via a wired connection between the battery and another power supply, such as by one or more power supplies that are external to computing device 2100 and connected to computing device 2100 via the one or more external power interfaces. In other examples, some or all of one or more batteries 2124 can be non-rechargeable batteries.

One or more external power interfaces 2126 of power system 2122 can include one or more wired-power interfaces, such as a USB cable and/or a power cord, that enable wired electrical power connections to one or more power supplies that are external to computing device 2100. One or more external power interfaces 2126 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 2126, computing device 2100 can draw electrical power from the external power source the established electrical power connection. In some examples, power system 2122 can include related sensors, such as battery sensors associated with the one or more batteries or other types of electrical power sensors.

Cloud-Based Servers

Figure 22:
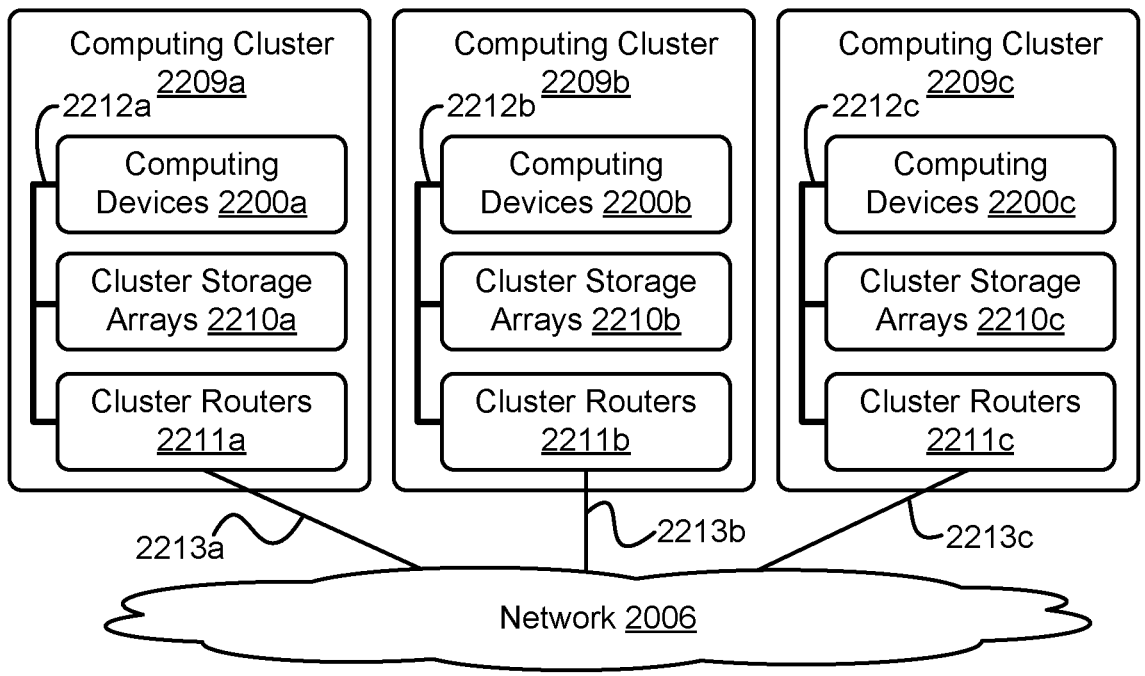
FIG. 22 depicts a network of computing clusters arranged as a cloud-based server system, in accordance with example embodiments.

FIG. 22 depicts a network 2006 of computing clusters 2209a, 2209b, 2209c arranged as a cloud-based server system in accordance with an example embodiment. Computing clusters 2209a, 2209b, 2209c can be cloud-based devices that store program logic and/or data of cloud-based applications and/or services; e.g., perform at least one function of and/or related to a convolutional neural network, confidence learning, a predicted target image, a predicted original lighting model, convolutional neural network 430, confidence learning 630, and/or method 2300.

In some embodiments, computing clusters 2209a, 2209b, 2209c can be a single computing device residing in a single computing center. In other embodiments, computing clusters 2209a, 2209b, 2209c can include multiple computing devices in a single computing center, or even multiple computing devices located in multiple computing centers located in diverse geographic locations. For example, FIG. 22 depicts each of computing clusters 2209a, 2209b, and 2209c residing in different physical locations.

In some embodiments, data and services at computing clusters 2209a, 2209b, 2209c can be encoded as computer readable information stored in non-transitory, tangible computer readable media (or computer readable storage media) and accessible by other computing devices. In some embodiments, computing clusters 2209a, 2209b, 2209c can be stored on a single disk drive or other tangible storage media, or can be implemented on multiple disk drives or other tangible storage media located at one or more diverse geographic locations.

FIG. 22 depicts a cloud-based server system in accordance with an example embodiment. In FIG. 22, functionality of a convolutional neural network, confidence learning, and/or a computing device can be distributed among computing clusters 2209a, 2209b, 2209c. Computing cluster 2209a can include one or more computing devices 2200a, cluster storage arrays 2210a, and cluster routers 2211a connected by a local cluster network 2212a. Similarly, computing cluster 2209b can include one or more computing devices 2200b, cluster storage arrays 2210b, and cluster routers 2211b connected by a local cluster network 2212b. Likewise, computing cluster 2209c can include one or more computing devices 2200c, cluster storage arrays 2210c, and cluster routers 2211c connected by a local cluster network 2212c.

In some embodiments, each of computing clusters 2209a, 2209b, and 2209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 2209a, for example, computing devices 2200a can be configured to perform various computing tasks of convolutional neural network, confidence learning, and/or a computing device. In one embodiment, the various functionalities of a convolutional neural network, confidence learning, and/or a computing device can be distributed among one or more of computing devices 2200a, 2200b, 2200c. Computing devices 2200b and 2200c in respective computing clusters 2209b and 2209c can be configured similarly to computing devices 2200a in computing cluster 2209a. On the other hand, in some embodiments, computing devices 2200a, 2200b, and 2200c can be configured to perform different functions.

In some embodiments, computing tasks and stored data associated with a convolutional neural network, confidence learning, and/or a computing device can be distributed across computing devices 2200a, 2200b, and 2200c based at least in part on the processing requirements of a convolutional neural network, confidence learning, and/or a computing device, the processing capabilities of computing devices 2200a, 2200b, 2200c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 2210a, 2210b, 2210c of computing clusters 2209a, 2209b, 2209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a convolutional neural network, confidence learning, and/or a computing device can be distributed across computing devices 2200a, 2200b, 2200c of computing clusters 2209a, 2209b, 2209c, various active portions and/or backup portions of these components can be distributed across cluster storage arrays 2210a, 2210b, 2210c. For example, some cluster storage arrays can be configured to store one portion of the data of a convolutional neural network, confidence learning, and/or a computing device, while other cluster storage arrays can store other portion(s) of data of a convolutional neural network, confidence learning, and/or a computing device. Additionally, some cluster storage arrays can be configured to store backup versions of data stored in other cluster storage arrays.

Cluster routers 2211a, 2211b, 2211c in computing clusters 2209a, 2209b, 2209c can include networking equipment configured to provide internal and external communications for the computing clusters. For example, cluster routers 2211a in computing cluster 2209a can include one or more internet switching and routing devices configured to provide (i) local area network communications between computing devices 2200a and cluster storage arrays 2210a via local cluster network 2212a, and (ii) wide area network communications between computing cluster 2209a and computing clusters 2209b and 2209c via wide area network link 2213a to network 2006. Cluster routers 2211b and 2211c can include network equipment similar to cluster routers 2211a, and cluster routers 2211b and 2211c can perform similar networking functions for computing clusters 2209b and 2209b that cluster routers 2211a perform for computing cluster 2209a.

In some embodiments, the configuration of cluster routers 2211a, 2211b, 2211c can be based at least in part on the data communication requirements of the computing devices and cluster storage arrays, the data communications capabilities of the network equipment in cluster routers 2211a, 2211b, 2211c, the latency and throughput of local cluster networks 2212a, 2212b, 2212c, the latency, throughput, and cost of wide area network links 2213a, 2213b, 2213c, and/or other factors that can contribute to the cost, speed, fault-tolerance, resiliency, efficiency and/or other design criteria of the moderation system architecture.

Example Methods of Operation

FIG. 23 is a flowchart of a method 2300, in accordance with example embodiments. Method 2300 can be executed by a computing device, such as computing device 2100. Method 2300 can begin at block 2310, where the computing device can train a neural network to apply a lighting model to an input image utilizing confidence learning that is based on light predictions and prediction confidence values associated with lighting of the input image, such as discussed above at least in the context of FIGS. 2-6.

In some examples, training the neural network to apply a lighting model to an input image utilizing confidence learning can include training a convolutional neural network to apply a lighting model to an input image utilizing confidence learning, such as discussed above at least in the context of FIGS. 5 and 6. In some of these examples, the lighting of the input image can be modeled using an original light model. In such examples, training the convolutional neural network to apply a lighting model to an input image utilizing confidence learning can include training the convolutional neural network utilizing confidence learning that is based on light predictions and prediction confidence values associated with the original light model, such as discussed above at least in the context of FIGS. 5 and 6. In some of these examples, training the convolutional neural network utilizing confidence learning that is based on light predictions and prediction confidence values associated with the original light model includes training the convolutional neural network utilizing confidence learning based on a light prediction of the original light model for a portion of the input image and a prediction confidence of the lighting prediction for the portion of the input image, such as discussed above at least in the context of FIG. 6.

In some examples, training the neural network to apply a lighting model to an input image can include training the neural network using a plurality of images of the object, where the plurality of images utilize a plurality of lighting models to light the object, such as discussed above at least in the context of FIGS. 2-5. In some examples, training the neural network can include training the neural network at the computing device, such as discussed above at least in the context of FIG. 19.

At block 2320, the computing device can receive an input image of an object and data about a particular lighting model to be applied to the input image, such as discussed above at least in the context of FIGS. 4-18.

In some examples, the lighting of the input image can be modeled using an original light model. In such examples, determining the output image can further include determining the output image and a prediction of the original light model using the trained neural network, such as discussed above at least in the context of FIGS. 4-18.

In some examples, the object can include an object that diffusely reflects light, such as discussed above at least in the context of FIGS. 4-18. In some examples, the object can include a face of a person, such as discussed above at least in the context of FIGS. 4-18.

In some examples, the computing device can include a camera. In such examples, receiving the input image of the object can include generating the input image of the object using the camera and receiving, at the computing device, the generated input image from the camera, such as discussed above at least in the context of FIGS. 2 and 3.

In some examples, the input image of the object can be a single image of the object, such as discussed above at least in the context of FIGS. 4-18.

At block 2330, the computing device can determine an output image of the object by using the trained neural network to apply the particular lighting model to the input image of the object, such as discussed above at least in the context of FIGS. 4-18.

In some examples, receiving the input image of the object and data about a particular lighting model to be applied to the input image can include receiving the input image of an object and data about a plurality of particular lighting models to be applied to the input image, and determining the output image can include determining a plurality of output images by applying each of the plurality of particular lighting models to the input image, such as discussed above at least in the context of FIGS. 2 and 3.

In some examples, determining the output image of the object by using the trained neural network can include obtaining the trained neural network at the computing device; and determining the output image of the object by the computing device using the obtained neural network, such as discussed above at least in the context of FIG. 19.

In some examples, method 2300 can further include providing the output image using the computing device, such as discussed above at least in the context of FIGS. 4-18.

In some examples, the lighting of the input image can be modeled using an original light model. In such examples, method 2300 can further include providing a prediction of the original light model using the computing device, such as discussed above at least in the context of FIGS. 4— 18.

In some examples, determining the output image of the object by using the trained neural network can include: determining, by the computing device a request to apply the particular lighting model to the input image; sending the request to apply the particular lighting model to the input image from the computing device to a second computing device, the second computing device including the trained neural network; and after sending the request, the computing device receiving, from the second computing device, the output image that applies the particular lighting model to the input image of the object, such as discussed above at least in the context of FIG. 19.

Additional Example Embodiments

The following clauses are offered as further description of the disclosure.

Clause 1—A computer-implemented method, including: training a neural network to apply a lighting model to an input image utilizing confidence learning that is based on light predictions and prediction confidence values associated with lighting of the input image; receiving an input image of an object and data about a particular lighting model to be applied to the input image at a computing device; and determining, by the computing device, an output image of the object by using the trained neural network to apply the particular lighting model to the input image of the object.

Clause 2—The computer-implemented method of Clause 1, where the lighting of the input image is modeled using an original light model, and where determining the output image further includes determining the output image and a prediction of the original light model using the trained neural network.

Clause 3—The computer-implemented method of either Clause 1 or Clause 2, where training the neural network to apply a lighting model to an input image utilizing confidence learning includes training a convolutional neural network to apply a lighting model to an input image utilizing confidence learning.

Clause 4—The computer-implemented method of Clause 3, where the lighting of the input image is modeled using an original light model, and where training the convolutional neural network to apply a lighting model to an input image utilizing confidence learning includes training the convolutional neural network utilizing confidence learning that is based on light predictions and prediction confidence values associated with the original light model.

Clause 5—The computer-implemented method of Clause 4, where training the convolutional neural network utilizing confidence learning that is based on light predictions and prediction confidence values associated with the original light model includes training the convolutional neural network utilizing confidence learning based on a light prediction of the original light model for a portion of the input image and a prediction confidence of the lighting prediction for the portion of the input image.

Clause 6—The computer-implemented method of any one of Clauses 1-5, where training the neural network to apply a lighting model to an input image includes training the neural network using a plurality of images of the object, where the plurality of images utilize a plurality of lighting models to light the object.

Clause 7—The computer-implemented method of any one of Clauses 1-6, where the object includes an object that diffusely reflects light.

Clause 8—The computer-implemented method of any one of Clauses 1-7, where the object includes a face of a person.

Clause 9—The computer-implemented method of any one of Clauses 1-8, where the computing device includes a camera, and where receiving the input image of the object includes: generating the input image of the object using the camera; and receiving, at the computing device, the generated input image from the camera.

Clause 10—The computer-implemented method of any one of Clauses 1-9, further including: providing the output image using the computing device.

Clause 11—The computer-implemented method of any one of Clauses 1-10, where the lighting of the input image is modeled using an original light model, and where the method further includes: providing a prediction of the original light model using the computing device.

Clause 12—The computer-implemented method of any one of Clauses 1-11, where receiving the input image of the object and data about a particular lighting model to be applied to the input image includes receiving the input image of the object and data about a plurality of particular lighting models to be applied to the input image, and where determining the output image includes determining a plurality of output images by applying each of the plurality of particular lighting models to the input image.

Clause 13—The computer-implemented method of any one of Clauses 1-12, where the input image of the object is a single image of the object.

Clause 14—The computer-implemented method of any one of Clauses 1-13, where determining the output image of the object by using the trained neural network includes: obtaining the trained neural network at the computing device; and determining the output image of the object by the computing device using the obtained neural network.

Clause 15—The computer-implemented method of Clause 14, where training the neural network includes training the neural network at the computing device.

Clause 16—The computer-implemented method of any one of Clauses 1-15, where determining the output image of the object by using the trained neural network includes: determining, by the computing device a request to apply the particular lighting model to the input image; sending the request to apply the particular lighting model to the input image from the computing device to a second computing device, the second computing device including the trained neural network; and after sending the request, the computing device receiving, from the second computing device, the output image that applies the particular lighting model to the input image of the object.

Clause 17—A computing device, including: one or more processors; and data storage, where the data storage has stored thereon computer-executable instructions that, when executed by the one or more processors, cause the computing device to carry out functions including the computer-implemented method of any one of Clauses 1-16.

Clause 18—An article of manufacture including one or more computer readable media having computer-readable instructions stored thereon that, when executed by one or more processors of a computing device, cause the computing device to carry out functions that include the computer-implemented method of any one of Clauses 1-16.

Clause 19—The article of manufacture of Clause 18, where the one or more computer readable media include one or more non-transitory computer readable media.

Clause 20—A computing device, including: means for carrying out the computer-implemented method of any one of Clauses 1-16.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A computer-implemented method, comprising:
training a neural network to apply a lighting model to an input image utilizing confidence learning that is based on light predictions and prediction confidence values associated with lighting of the input image, wherein the light predictions comprise a prediction of an original light model indicative of a location of one or more environmental light sources with reference to an object in the input image;
receiving a particular input image of a particular object and data about a particular lighting model to be applied to the particular input image at a computing device; and
determining, by the computing device and based on a particular original light model predicted by the neural network, an output image of the particular object by using the trained neural network to apply the particular lighting model to the particular input image of the particular object.

2. The computer-implemented method of claim 1, wherein training the neural network to apply a lighting model to an input image utilizing confidence learning comprises training a convolutional neural network to apply a lighting model to an input image utilizing confidence learning.

3. The computer-implemented method of claim 2, wherein the lighting of the input image is modeled using the original light model, and wherein training the convolutional neural network to apply a lighting model to an input image utilizing confidence learning comprises training the convolutional neural network utilizing confidence learning that is based on light predictions and prediction confidence values associated with the original light model.

4. The computer-implemented method of claim 3, wherein training the convolutional neural network utilizing confidence learning that is based on light predictions and prediction confidence values associated with the original light model comprises training the convolutional neural network utilizing confidence learning based on a light prediction of the original light model for a portion of the input image and a prediction confidence of the lighting prediction for the portion of the input image.

5. The computer-implemented method of claim 1, wherein training the neural network to apply a lighting model to an input image comprises training the neural network using a plurality of images of the object, where the plurality of images utilize a plurality of lighting models to light the object.

6. The computer-implemented method of claim 1, wherein the object comprises an object that diffusely reflects light.

7. The computer-implemented method of claim 1, wherein the object comprises a face of a person.

8. The computer-implemented method of claim 1, wherein the computing device comprises a camera, and wherein receiving the particular input image of the particular object comprises:
generating the particular input image of the particular object using the camera; and
receiving, at the computing device, the generated input image from the camera.

9. The computer-implemented method of claim 1, further comprising:
providing the output image using the computing device.

10. The computer-implemented method of claim 1, wherein the lighting of the input image is modeled using the particular original light model predicted by the neural network, and wherein the method further comprises:

providing the particular original light model predicted by the neural network using the computing device.

11. The computer-implemented method of claim 1, wherein receiving the particular input image of the particular object and data about the particular lighting model to be applied to the particular input image comprises receiving the particular input image of the particular object and data about a plurality of particular lighting models to be applied to the particular input image, and wherein determining the output image comprises determining a plurality of output images by applying each of the plurality of particular lighting models to the particular input image.

12. The computer-implemented method of claim 1, wherein the particular input image of the particular object is a single image of the particular object.

13. The computer-implemented method of claim 1, wherein determining the output image of the particular object by using the trained neural network comprises:
obtaining the trained neural network at the computing device; and
determining the output image of the particular object by the computing device using the obtained neural network.

14. The computer-implemented method of claim 13, wherein training the neural network comprises training the neural network at the computing device.

15. The computer-implemented method of claim 1, wherein determining the output image of the particular object by using the trained neural network comprises:
determining, by the computing device a request to apply the particular lighting model to the particular input image;
sending the request to apply the particular lighting model to the particular input image from the computing device to a second computing device, the second computing device comprising the trained neural network; and
after sending the request, the computing device receiving, from the second computing device, the output image that applies the particular lighting model to the particular input image of the particular object.

16. The computer-implemented method of claim 1, wherein the original light model, the particular lighting model, or both, comprise data representing one or more of (i) a color, (ii) an intensity, (iii) an albedo, (iv) a light direction, (v) a surface normal, or (vi) one or more light sources, wherein at least one light source has a different location between the original light model and the particular lighting model.

17. The computer-implemented method of claim 1, wherein the training of the neural network comprises training with a dataset comprising a plurality of images comprising one or more objects under a plurality of different lighting conditions comprising one or more of (i) lighting provided from different directions, (ii) lighting provided of varying intensities, (iii) lighting provided with light sources of different colors, or (iv) lighting provided with different numbers of light sources.

18. A computing device, comprising:
one or more processors; and
data storage, wherein the data storage has stored thereon computer-executable instructions that, when executed by the one or more processors, cause the computing device to carry out functions comprising:
training a neural network to apply a lighting model to an input image utilizing confidence learning that is based on light predictions and prediction confidence values associated with lighting of the input image, wherein the light predictions comprise a prediction of an original light model indicative of a location of one or more environmental light sources with reference to an object in the input image;
receiving a particular input image of a particular object and data about a particular lighting model to be applied to the particular input image at a computing device; and
determining, by the computing device and based on a particular original light model predicted by the neural network, an output image of the particular object by using the trained neural network to apply the particular lighting model to the particular input image of the particular object.

19. An article of manufacture comprising one or more computer readable media having computer-readable instructions stored thereon that, when executed by one or more processors of a computing device, cause the computing device to carry out functions comprising:
training a neural network to apply a lighting model to an input image utilizing confidence learning that is based on light predictions and prediction confidence values associated with lighting of the input image, wherein the light predictions comprise a prediction of an original light model indicative of a location of one or more environmental light sources with reference to an object in the input image;
receiving a particular input image of a particular object and data about a particular lighting model to be applied to the particular input image at a computing device; and
determining, by the computing device and based on a particular original light model predicted by the neural network, an output image of the particular object by using the trained neural network to apply the particular lighting model to the particular input image of the particular object.

20. The article of manufacture of claim 19, wherein the one or more computer readable media comprise one or more non-transitory computer readable media.

* * * * *